United States Patent
Liu et al.

(10) Patent No.: US 10,136,144 B2
(45) Date of Patent: Nov. 20, 2018

(54) METHOD AND APPARATUS OF INTER-LAYER FILTERING FOR SCALABLE VIDEO CODING

(71) Applicant: MEDIATEK Singapore Pte. Ltd., Singapore (SG)

(72) Inventors: Shan Liu, San Jose, CA (US); Mei Guo, San Jose, CA (US); Chia-Yang Tsai, New Taipei (TW); Ching-Yeh Chen, Taipei (TW); Shaw-Min Lei, Hsinchu County (TW)

(73) Assignee: MEDIATEK Singapore Pte. Ltd., Singapore (SG)

( * ) Notice: Subject to any disclaimer, the term of this patent is extended or adjusted under 35 U.S.C. 154(b) by 684 days.

(21) Appl. No.: 14/397,146

(22) PCT Filed: May 21, 2013

(86) PCT No.: PCT/CN2013/075988
§ 371 (c)(1),
(2) Date: Oct. 24, 2014

(87) PCT Pub. No.: WO2013/174254
PCT Pub. Date: Nov. 28, 2013

(65) Prior Publication Data
US 2015/0103900 A1 Apr. 16, 2015

Related U.S. Application Data

(60) Provisional application No. 61/649,679, filed on May 21, 2012, provisional application No. 61/683,453, (Continued)

(51) Int. Cl.
*H04N 19/14* (2014.01)
*H04N 19/31* (2014.01)
(Continued)

(52) U.S. Cl.
CPC ........... *H04N 19/31* (2014.11); *H04N 19/117* (2014.11); *H04N 19/14* (2014.11); *H04N 19/154* (2014.11);
(Continued)

(58) Field of Classification Search
CPC ....................................................... H04N 19/31
(Continued)

(56) References Cited

U.S. PATENT DOCUMENTS

2008/0165848 A1* 7/2008 Ye .................... H04N 19/105
375/240.13
2008/0165863 A1 7/2008 Yan
(Continued)

FOREIGN PATENT DOCUMENTS

CN 101102503 A 1/2008
CN 101601299 A 12/2009
(Continued)

OTHER PUBLICATIONS

Guo et al., "Localized Multiple Adaptive Interpolation Filters with Single-Pass Encoding", Visual Communications and Image Processing; Jul. 11, 2010-Jul. 14, 2010; Jul. 11, 2010.*
(Continued)

*Primary Examiner* — William C Vaughn, Jr.
*Assistant Examiner* — Joseph A Towe
(74) *Attorney, Agent, or Firm* — Oblon, McClelland, Maier & Neustadt, L.L.P.

(57) ABSTRACT

A method and apparatus for inter-layer prediction for scalable video coding are disclosed. Embodiments according to the present invention apply inter-layer adaptive filtering to the video data derived from the reconstructed BL video data to generate inter-layer adaptive filtered data. The inter-layer adaptive filtered data is then included as prediction data to encode or decode the EL video data. The video data derived (Continued)

from the reconstructed BL video data is up-sampled before applying inter-layer adaptive filtering. The up-sampling may also be included in the inter-layer adaptive filtering. In another embodiment, the inter-layer adaptive filtering comprises adaptive up-sampling. For up-sampled BL video data at locations not collocated with the EL video data, the up-sampled BL video data is divided into location types according to locations of the up-sampled BL video data. Each location type may have an individual filter for up-sampling video data in the group.

30 Claims, 23 Drawing Sheets

Related U.S. Application Data filed on Aug. 15, 2012, provisional application No. 61/701,158, filed on Sep. 14, 2012, provisional application No. 61/730,839, filed on Nov. 28, 2012, provisional application No. 61/732,505, filed on Dec. 3, 2012, provisional application No. 61/737,283, filed on Dec. 14, 2012, provisional application No. 61/737,293, filed on Dec. 14, 2012, provisional application No. 61/750,037, filed on Jan. 8, 2013.

(51) Int. Cl.
*H04N 19/33* (2014.01)
*H04N 19/46* (2014.01)
*H04N 19/59* (2014.01)
*H04N 19/70* (2014.01)
*H04N 19/80* (2014.01)
*H04N 19/117* (2014.01)
*H04N 19/154* (2014.01)
*H04N 19/176* (2014.01)
*H04N 19/503* (2014.01)

(52) U.S. Cl.
CPC ........... *H04N 19/176* (2014.11); *H04N 19/33* (2014.11); *H04N 19/503* (2014.11); *H04N 19/59* (2014.11); *H04N 19/80* (2014.11); *H04N 19/46* (2014.11); *H04N 19/70* (2014.11)

(58) Field of Classification Search
USPC ................................................... 375/240.12
See application file for complete search history.

(56) References Cited

U.S. PATENT DOCUMENTS

| | | | | |
|---|---|---|---|---|
| 2008/0174694 A1* | 7/2008 | Morad | ................... | H04N 7/012 348/448 |
| 2010/0046612 A1* | 2/2010 | Sun | ....................... | H04N 19/149 375/240.02 |
| 2012/0046612 A1* | 2/2012 | Scheremet | ............ | A61M 5/158 604/179 |
| 2012/0081553 A1* | 4/2012 | Cote | ...................... | H04N 9/045 348/207.1 |
| 2012/0147967 A1* | 6/2012 | Panchal | ............... | H04N 19/197 375/240.17 |
| 2013/0142251 A1* | 6/2013 | Maani | .................... | H04N 19/70 375/240.03 |
| 2013/0188882 A1* | 7/2013 | Zhao | ..................... | H04N 19/503 382/233 |

FOREIGN PATENT DOCUMENTS

| | | | | |
|---|---|---|---|---|
| CN | 102065302 A | 5/2011 | | |
| EP | 1 720 358 | 11/2006 | | |
| EP | EP 1720358 A2 * | 11/2006 | ............... | H04B 1/66 |
| WO | WO 2010/027637 | 3/2010 | | |
| WO | WO 2012/167712 | 12/2012 | | |

OTHER PUBLICATIONS

Hong et al., "Scalability Support in HEVC", JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16).*

"JSVM Software Manual", Version: JSVM 9.18.1, Last Update: Jun. 19, 2009. server date Nov. 4, 2009; downloaded by EPO on Oct. 22, 2010.*

Hong, D., et al.; "Scalability Support in HEVC;" Joint Collaborative Team on Video Coding (JCT-VC) of ITU-T SG16 WP3 and ISO/IEC JTC1/SC29/WG11; Jul. 2011; pp. 1-12.

Kim, C., et al.; "Description of scalable video coding technology proposal by LG Electronics and MediaTek (differential coding mode on);" Joint Collaborative Team on Video Coding (JCT-VC) of ITU-T SG16 WP3 and ISO/IEC JTC1/SC29/WG11; Oct. 2012; pp. 1-38.

Guo, X., et al.; "Localized Multiple Adaptive Interpolation Filters with Single-Pass Encoding;" Visual Communications and Image Processing; 2010; pp. 1-8.

JSVM Software Manual; ITU-T Draft-Study Period; Jun. 2009; pp. 1-76.

Xue, K., et al.; "An Interactively Interpolative Vector Quantization Algorithm for Image Data Compression;" IEEE; 1991; pp. 139-148.

Ye, Y., et al.; "SVC ESS improved residual upsampling for extended spatial scalability;" Joint Video Team (JVT) of ISO/IEC MPEG & ITU-T VCEG (ISO/IEC JTC1/SC29/WG11 and ITU-T SG16 Q.6); Jan. 2007; pp. 1-8.

* cited by examiner

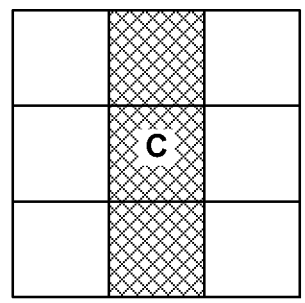
90° EO
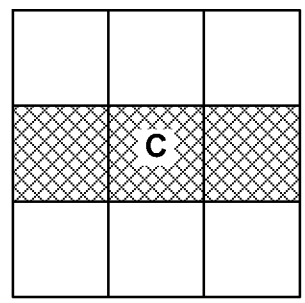
0° EO
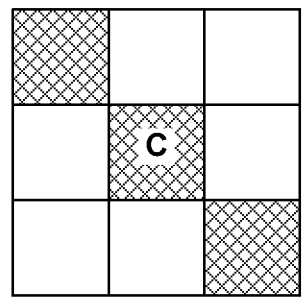
135° EO
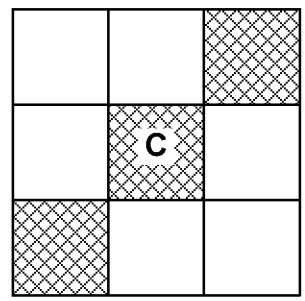
45° EO
Fig. 3

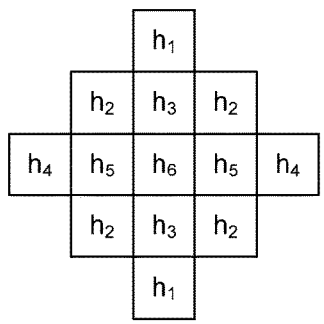 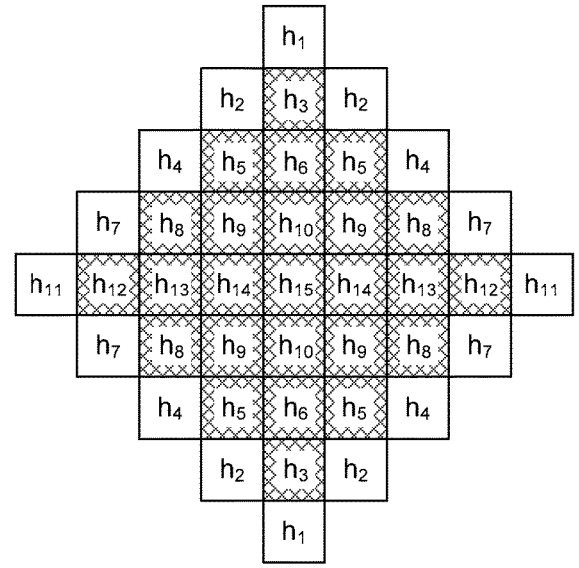
Fig. 14A
Fig. 14B
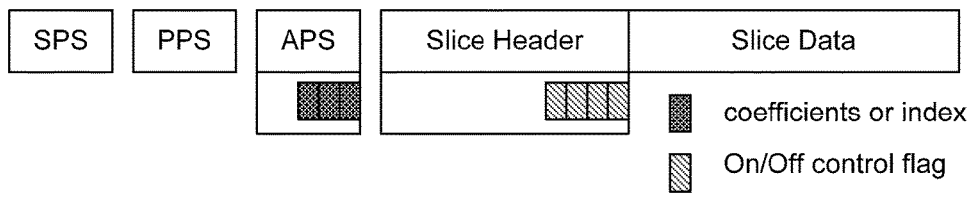
Fig. 15
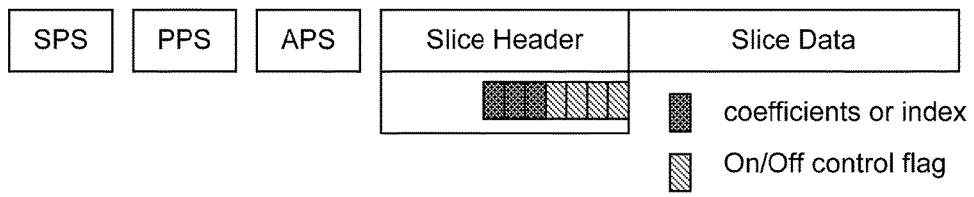
Fig. 16

| BO | OFF | |
|---|---|---|
| EO | EO | BO |
| | EO | OFF |

Fig. 19

| interlayer_sao_param( ) { | Descriptor |
|---|---|
|   interlayer_sao_split_param( 0, 0, 0, 0 ) | |
|   interlayer_sao_offset_param( 0, 0, 0, 0 ) | |
|   interlayer_sao_flag_cb | u(1) |
|   if(interlayer_sao_flag_cb ) { | |
|     interlayer_sao_split_param( 0, 0, 0, 1 ) | |
|     interlayer_sao_split_param( 0, 0, 0, 1 ) | |
|   } | |
|   interlayer_sao_flag_cr | u(1) |
|   if(interlayer_sao_flag_cr ) { | |
|     interlayer_sao_split_param( 0, 0, 0, 2 ) | |
|     interlayer_sao_split_param( 0, 0, 0, 2 ) | |
|   } | |
| } | |

Fig. 20

| interlayer_sao_split_param( rx, ry, saoDepth , cIdx ) { | Descriptor |
|---|---|
| if(interlayer_aoDepth < SaoMaxDepth ) | |
|    interlayer_sao_split_flag[ cIdx ][ saoDepth ][ rx ][ ry ] | u(1) |
| else | |
|    interlayer_sao_split_flag[ cIdx ][ saoDepth ][ rx ][ ry ] = 0 | |
| if(interlayer_sao_split_flag[ cIdx ][ saoDepth ][ rx ][ ry ] ) { | |
|    interlayer_sao_split_param( 2*rx + 0, 2*ry + 0, saoDepth + 1 , cIdx ) | |
|    interlayer_sao_split_param( 2*rx + 1, 2*ry + 0, saoDepth + 1 , cIdx ) | |
|    interlayer_sao_split_param( 2*rx + 0, 2*ry + 1, saoDepth + 1 , cIdx ) | |
|    interlayer_sao_split_param( 2*rx + 1, 2*ry + 1, saoDepth + 1 , cIdx ) | |
| } | |
| } | |

Fig. 21

| interlayer_sao_offset_param( rx, ry, saoDepth , cIdx ) { | Descriptor |
|---|---|
| if(interlayer_sao_split_flag[ cIdx ][ saoDepth ][ rx ][ ry ] ) { | |
|    interlayer_sao_offset_param( 2*rx + 0, 2*ry + 0, saoDepth + 1 , cIdx ) | |
|    interlayer_sao_offset_param( 2*rx + 1, 2*ry + 0, saoDepth + 1 , cIdx ) | |
|    interlayer_sao_offset_param( 2*rx + 0, 2*ry + 1, saoDepth + 1 , cIdx ) | |
|    interlayer_sao_offset_param( 2*rx + 1, 2*ry + 1, saoDepth + 1 , cIdx ) | |
| } else { | |
|    interlayer_sao_type_idx[ cIdx ][ saoDepth ][ rx ][ ry ] | ue(v) |
|    if(interlayer_sao_type_idx[ cIdx ][ saoDepth ][ rx ][ ry ] != 0 ) | |
|      If (interlayer_sao_type_idx[ cIdx ][ saoDepth ][ rx ][ ry ] == band_offset) | |
|         interlayer_band_poisition[ cIdx ][ saoDepth ][ rx ][ ry ] | Fixed length |
|      for( i = 0; i < NumSaoClass[ sao_type_idx ]; i++ ) | |
|         interlayer_sao_offset[ cIdx ][ saoDepth ][ x0 ][ y0 ][ i ] | se(v) |
| } | |
| } | |

Fig. 22

METHOD AND APPARATUS OF INTER-LAYER FILTERING FOR SCALABLE VIDEO CODING

CROSS REFERENCE TO RELATED APPLICATIONS

The present invention claims priority to U.S. Provisional Patent Application Ser. No. 61/649,679, filed May 21, 2012, entitled "Inter-layer filtering for Scalable Video Coding Extension of High Efficiency Video Coding", U.S. Provisional Patent Application Ser. No. 61/683,453, filed Aug. 15, 2012, entitled "Methods and apparatus for inter-layer adaptive up-sampling and filtering in scalable video coding", U.S. Provisional Patent Application Ser. No. 61/701,158, filed Sep. 14, 2012, entitled "Improvement of Interlayer-Layer Sample Adaptive Offset", U.S. Provisional Patent Application Ser. No. 61/730,839, filed Nov. 28, 2012, entitled "Methods and apparatus for inter-layer adaptive filtering in scalable video coding", U.S. Provisional Patent Application Ser. No. 61/732,505, filed Dec. 3, 2012, entitled "Inter-layer Adaptive Filtering in Scalable Video Coding", U.S. Provisional Patent Application Ser. No. 61/737,283, filed Dec. 14, 2012, entitled "Methods and Apparatus for Inter-layer Coding in Scalable Video Coding", U.S. Provisional Patent Application Ser. No. 61/737,293, filed Dec. 14, 2012, entitled "Methods and Apparatus for Inter-layer Coding in Scalable Video Coding" and U.S. Provisional Patent Application Ser. No. 61/750,037, filed Jan. 8, 2013, entitled "Methods and Apparatus for Inter-layer Coding in Scalable Video Coding". The U.S. Provisional patent applications are hereby incorporated by reference in their entireties.

TECHNICAL FIELD

The present invention relates to scalable video coding. In particular, the present invention relates to inter-layer filtering between layers for scalable video coding.

BACKGROUND

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video service. In such applications, the compressed video usually preserves high resolution and high quality so that the video content is suited for high-definition devices such as an HDTV or a high resolution LCD display. The same content may also be carried through cellular data network so that the content can be watch on a portable device such as a smart phone or a network-connected portable media device. In such applications, due to the network bandwidth concerns as well as the typical low-resolution display on the smart phone or portable devices, the video content usually is compressed into lower resolution and lower bitrates. Therefore, for different network environment and for different applications, the video resolution and video quality requirements are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that videos at different spatial-temporal resolution and/or quality can be derived from the same compressed bitstream.

The joint video team (JVT) of ISO/IEC MPEG and ITU-T VCEG standardized a Scalable Video Coding (SVC) extension of the H.264/AVC standard. An H.264/AVC SVC bitstream can contain video information from low frame-rate, low resolution, and low quality to high frame rate, high definition, and high quality. This single bitstream can be adapted to various applications and displayed on devices with different configurations. Accordingly, H.264/AVC SVC is suitable for various video applications such as video broadcasting, video streaming, and video surveillance to adapt to network infrastructure, traffic condition, user preference, and etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of the SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream that are required for decoding the intended video. NAL units for quality refinement can be additionally truncated in order to reduce the bit-rate and the associated video quality.

In SVC, spatial scalability is supported based on the pyramid coding scheme as shown in FIG. 1. In a SVC system with spatial scalability, the video sequence is first down-sampled to obtain smaller pictures at different spatial resolutions (layers). For example, picture 110 at the original resolution can be processed by spatial decimation 120 to obtain resolution-reduced picture 111. The resolution-reduced picture 111 can be further processed by spatial decimation 121 to obtain further resolution-reduced picture 112 as shown in FIG. 1. In addition to dyadic spatial resolution, where the spatial resolution is reduced to half in each level, SVC also supports arbitrary resolution ratios, which is called extended spatial scalability (ESS). The SVC system in FIG. 1 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 112 is coded using motion-compensated and Intra prediction 130.

The motion-compensated and Intra prediction 130 will generate syntax elements as well as coding related information such as motion information for further entropy coding 140. FIG. 1 actually illustrates a combined SVC system that provides spatial scalability as well as quality scalability (also called SNR scalability). The system may also provide temporal scalability, which is not explicitly shown. For each single-layer coding, the residual coding errors can be refined using SNR enhancement layer coding 150. The SNR enhancement layer in FIG. 1 may provide multiple quality levels (quality scalability). Each supported resolution layer can be coded by respective single-layer motion-compensated and Intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 1, layer-1 pictures 111 can be coded by motion-compensated and Intra prediction 131, base layer entropy coding 141 and SNR enhancement layer coding 151. As shown in FIG. 1, the reconstructed BL video data is also utilized by motion-compensated and Intra prediction 131, where a coding block in spatial layer 1 may use the reconstructed BL video data as an additional Intra prediction data (i.e., no motion compensation is involved). Similarly, layer-2 pictures 110 can be coded by motion-compensated and Intra prediction 132, base layer entropy coding 142 and SNR enhancement layer coding 152. The BL bitstreams and SNR enhancement layer bitstreams from all spatial layers are multiplexed by multiplexer 160 to generate a scalable bitstream. The coding efficiency can be improved due to inter-layer coding. Furthermore, the information required to code spatial layer 1 may depend on reconstructed layer 0 (inter-layer prediction). A higher layer in an SVC system is referred as an enhancement layer. The H.264 SVC provides three types of inter-layer prediction tools: inter-layer motion prediction, inter-layer Intra prediction, and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the BL. If base_mode_flag is equal to 1, the partitioning data of the EL macroblock along with the associated reference indexes and motion vectors are derived from the corresponding data of the collocated 8×8 block in the BL. The reference picture index of the BL is directly used in the EL. The motion vectors of the EL are scaled from the data associated with the BL. Besides, the scaled BL motion vector can be used as an additional motion vector predictor for the EL.

Inter-layer residual prediction uses the up-sampled BL residual information to reduce the information required for coding the EL residuals. The collocated residual of the BL can be block-wise up-sampled using a bilinear filter and can be used as prediction for the residual of a corresponding macroblock in the EL. The up-sampling of the reference layer residual is done on transform block basis in order to ensure that no filtering is applied across transform block boundaries.

Similar to inter-layer residual prediction, the inter-layer Intra prediction reduces the redundant texture information of the EL. The prediction in the EL is generated by block-wise up-sampling the collocated BL reconstruction signal. In the inter-layer Intra prediction up-sampling procedure, 4-tap and 2-tap FIR filters are applied for luma and chroma components, respectively. Different from inter-layer residual prediction, filtering for the inter-layer Intra prediction is always performed across sub-block boundaries. For decoding simplicity, inter-layer Intra prediction can be applied only to the intra-coded macroblocks in the BL.

As shown in FIG. 1, reconstructed video at a lower layer is used for coding by a higher layer. The lower layer video corresponds to lower spatial or temporal resolution, or lower quality (i.e., lower SNR). When the lower spatial resolution video in a lower layer is used by a higher layer coding, the lower spatial resolution video usually is up-sampled to match the spatial resolution of the higher layer. The up-sampling process artificially increases the spatial resolution. However, it also introduces undesirable artifacts. It is desirable to develop new techniques to use reconstructed video at a layer with lower spatial resolution to improve the inter-layer coding efficiency.

In HEVC, two new in-loop filters have been developed to improve the coding efficiency. One of the in-loop filters is called sample adaptive offset (SAO), which performs pixel classification on the reconstructed pictures and then derive an offset for each group of pixels to reduce the distortion between original pictures and reconstructed pictures. The other in-loop filter is called adaptive loop filter (ALF), which is applied as a set of Wiener filters to minimize the mean-squared error (MSE) between the reconstructed and original pictures. FIG. 2 illustrates an exemplary system diagram for an HEVC encoder, where SAO 231 and ALF 232 are applied to reconstructed video data processed by deblocking filter (DF) 230.

FIG. 2 illustrates an exemplary adaptive inter/Intra video encoding system incorporating in-loop processing. For inter-prediction, Motion Estimation (ME)/Motion Compensation (MC) 212 is used to provide prediction data based on reconstructed video data corresponding to other picture frames. Mode decision 214 selects Intra Prediction 210 or inter-prediction (i.e., ME/MC processed) data 212 and the selected prediction data is supplied to Adder 216 to form prediction errors, also called residues. The prediction error is then processed by Transformation (T) 218 followed by Quantization (Q) 220. The transformed and quantized residues are then coded by Entropy Encoder 222 to form a video bitstream corresponding to the compressed video data. The bitstream associated with the transform coefficients is then packed with side information such as motion, mode, and other information associated with the image area. The side information may also be processed by entropy coding to reduce required bandwidth. Accordingly, the data associated with the side information of SAO and ALF are also provided to Entropy Encoder 222 as shown in FIG. 2. When an inter-prediction mode is used, a reference picture or pictures have to be reconstructed at the encoder end as well. Consequently, the transformed and quantized residues are processed by Inverse Quantization (IQ) 224 and Inverse Transformation (IT) 226 to recover the residues. The residues are then added back to prediction data 236 at Reconstruction (REC) 228 to reconstruct the video data. The reconstructed video data may be stored in Reference Picture Buffer 234 and used for prediction of other frames.

As shown in FIG. 2, incoming video data undergoes a series of processing in the encoding system. The reconstructed video data from REC 228 may be subject to various impairments due to a series of processing. Accordingly, various in-loop processing is applied to the reconstructed video data before the reconstructed video data are stored in the Reference Picture Buffer 234 in order to improve video quality. In the High Efficiency Video Coding (HEVC) standard being developed, Deblocking Filter (DF) 230 and Sample Adaptive Offset (SAO) 231 have been developed to enhance picture quality. The filter operations of SAO 231 and ALF 232 are adaptive and filter information may have to be incorporated in the bitstream so that a decoder can properly recover the required information. Therefore, loop filter information from SAO 231 and ALF 232 is provided to Entropy Encoder 222 for incorporation into the bitstream. In FIG. 2, DF 230 is applied to the reconstructed video first and SAO 231 and ALF 232 are then applied to DF-processed video.

The coding process in HEVC is applied to each image region named Largest Coding Unit (LCU). The LCU is adaptively partitioned into coding units using quadtree. The LCU is also called Coding Tree Block (CTB). For each leaf CU, DF is performed for each 8×8 block in HEVC. For each 8×8 block, horizontal filtering across vertical block boundaries is first applied, and then vertical filtering across horizontal block boundaries is applied.

In SAO, pixel classification is first done to classify pixels into different categories. Upon the classification of all pixels in a picture or a region, one offset is derived and transmitted for each group of pixels. For SAO, one picture is divided into multiple LCU-aligned regions. Each region can select one SAO type among two Band Offset (BO) types, four Edge Offset (EO) types, and no processing (OFF). For each to-be-processed (also called to-be-filtered) pixel, BO uses the pixel intensity to classify the pixel into a band. As for EO, it uses two neighboring pixels of a to-be-processed pixel to classify the pixel into a category. The four EO types correspond to 0°, 90°, 135°, and 45° as shown in FIG. 3. Similar to BO, one offset value is derived for all pixels of each category except for category 0, where Category 0 is forced to use zero offset. Table 1 shows the EO pixel classification, where "C" denotes the pixel to be classified. Therefore, four offset values are coded for each coding tree block (CTB) or Largest Coding Unit (LCU) when EO types are used.

TABLE 1

| Categ | Condition |
| --- | --- |
| 1 | C < two neighbors |
| 2 | C < one neighbor && C == one |
| 3 | C > one neighbor && C == one |
| 4 | C > two neighbors |
| 0 | None of the above |

In a single layer coding system such as HEVC, the coding efficiency has been benefited from the use of in-loop filters. It is desirable to apply in-loop filters to scalable video system to improve the coding efficiency.

SUMMARY

A method and apparatus for inter-layer prediction for scalable video coding are disclosed, wherein the video data is configured into a Base Layer (BL) and an Enhancement Layer (EL) and wherein EL video data has higher spatial resolution or better video quality than BL video data. Embodiments according to the present invention apply inter-layer adaptive filtering to the video data derived from the reconstructed BL video data to generate inter-layer adaptive filtered data. The inter-layer adaptive filtered data is then included in prediction data to encode or decode the EL video data. In one embodiment, the video data derived from the reconstructed BL video data is up-sampled before applying inter-layer adaptive filtering. In another embodiment, the video data derived from the reconstructed BL video data is applied adaptive inter-layer filtering before it is up-sampled. In other embodiment, the up-sampling is included in the inter-layer adaptive filtering.

The inter-layer adaptive filtering can be applied to the reconstructed BL video data or processed reconstructed BL video data, where the processed reconstructed BL video data corresponds to the reconstructed BL video data further processed by deblocking, a combination of deblocked and sample adaptive offset (SAO), or a combination of deblocking, SAO and adaptive loop filtering (ALF).

The inter-layer adaptive filtering may comprise adaptive filtering followed by fixed up-sampling. In one embodiment, the inter-layer adaptive filtering comprises adaptive up-sampling. In another embodiment of the adaptive up-sampling, the up-sampled BL video data at locations collocated with the EL video data is filtered by applying filtering to collocated BL video data derived from the reconstructed BL video data, where the collocated BL video data has corresponding collocated pixels in the EL. The adaptive up-sampling may correspond to (2N+1)×(2N+1) diamond filters. For up-sampled BL video data at locations not collocated with the EL video data, the up-sampled BL video data is divided into location types according to locations of the up-sampled BL video data. Each location type may have an individual filter to up-sample video data in the group.

One aspect of the present invention addresses local adaptivity of the inter-layer adaptive filtering. The inter-layer adaptive filtering can be applied to on a picture basis or a region basis, where each picture or region may have its own filter information such as filter coefficients of filter On/Off. The region may correspond to a group of coding units, a group of largest coding units (LCUs), a slice, a group of slices, a tile or a group of tiles. The filter coefficients of the inter-layer adaptive filtering can be included in picture parameter set (PPS), application parameter set (APS), or a slice header. A flag can be included in each largest coding unit (LCU) to indicate whether the inter-layer adaptive filtering is applied to the LCU.

In one embodiment, the inter-layer adaptive filtering comprises fixed up-sampling followed by adaptive filtering. In this case, a single filter can be used, where the single filter is equivalent to combined filtering using the fixed set of filters and the adaptive filtering, and filter coefficients of the adaptive filtering are derived from the bitstream. In another embodiment, the inter-layer adaptive filtering comprises iterative inter-layer sample adaptive offset (IT-IL-SAO). In yet another embodiment, the inter-layer adaptive filtering comprises multiple inter-layer filtering branches and one of the multiple inter-layer filtering branches is selected for the inter-layer adaptive filtering.

BRIEF DESCRIPTION OF DRAWINGS

FIG. 3 illustrates edge offset (EO) based sample adaptive offset (SAO) of HEVC, where four edge classes corresponding to 0°, 90°, 135° and 45° are used.

FIG. 14A illustrates a 5×5 diamond shaped filter for filtering up-sampled collocated BL video data.

FIG. 14B illustrates a 7×7 and a 9×9 diamond shaped filters for filtering up-sampled collocated BL video data.

FIG. 15 illustrates an example of incorporating filter information in the APS and slice header.

FIG. 16 illustrates an example of incorporating filter information in the slice header.

FIG. 19 illustrates an example of region-based inter-layer SAO, where a picture is partitioned into regions using a quadtree and an SAO type is selected for each region.

FIG. 20 illustrates an exemplary syntax design for inter-layer SAO parameters.

FIG. 21 illustrates an exemplary syntax design for inter-layer SAO split parameters.

FIG. 22 illustrates an exemplary syntax design for inter-layer SAO offset parameters.

DETAILED DESCRIPTION

Figure 1:
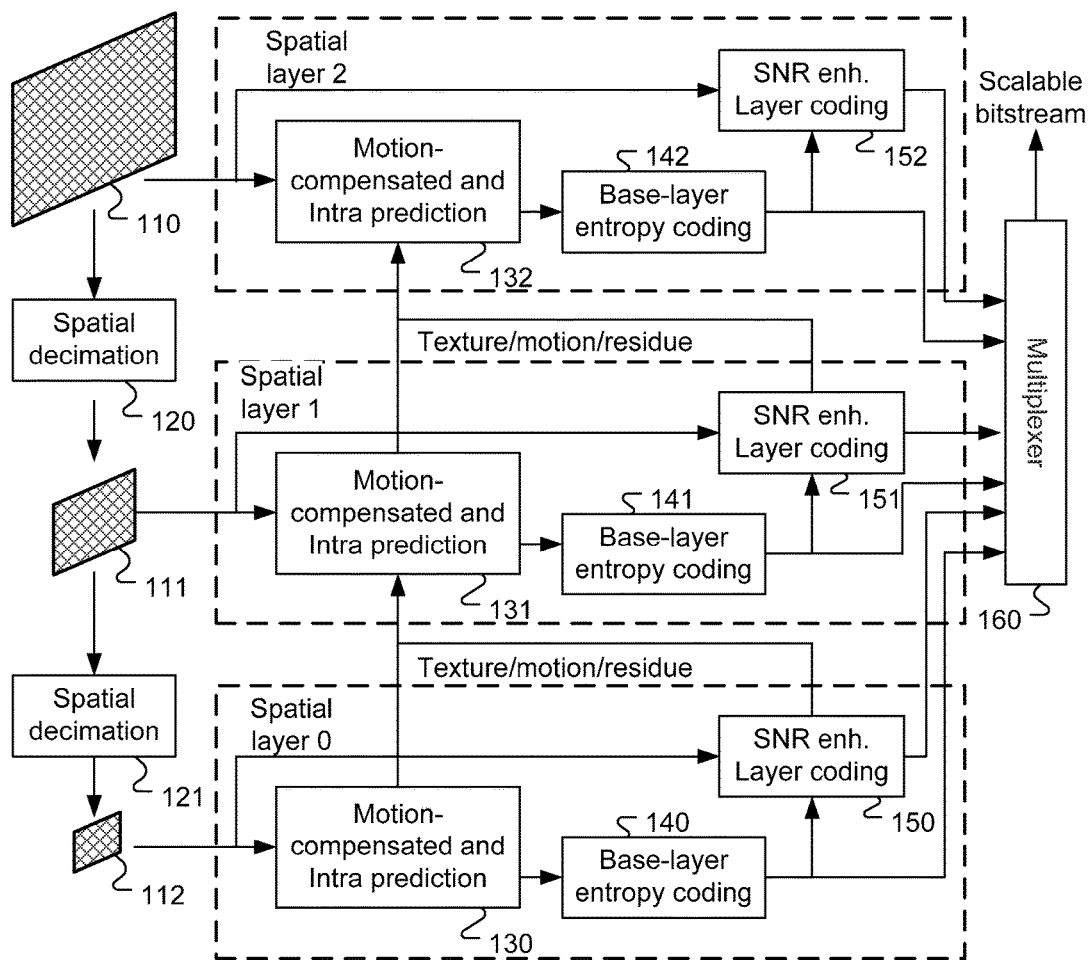
FIG. 1 illustrates an example of prediction structure for a scalable video coding system.
Figure 2:
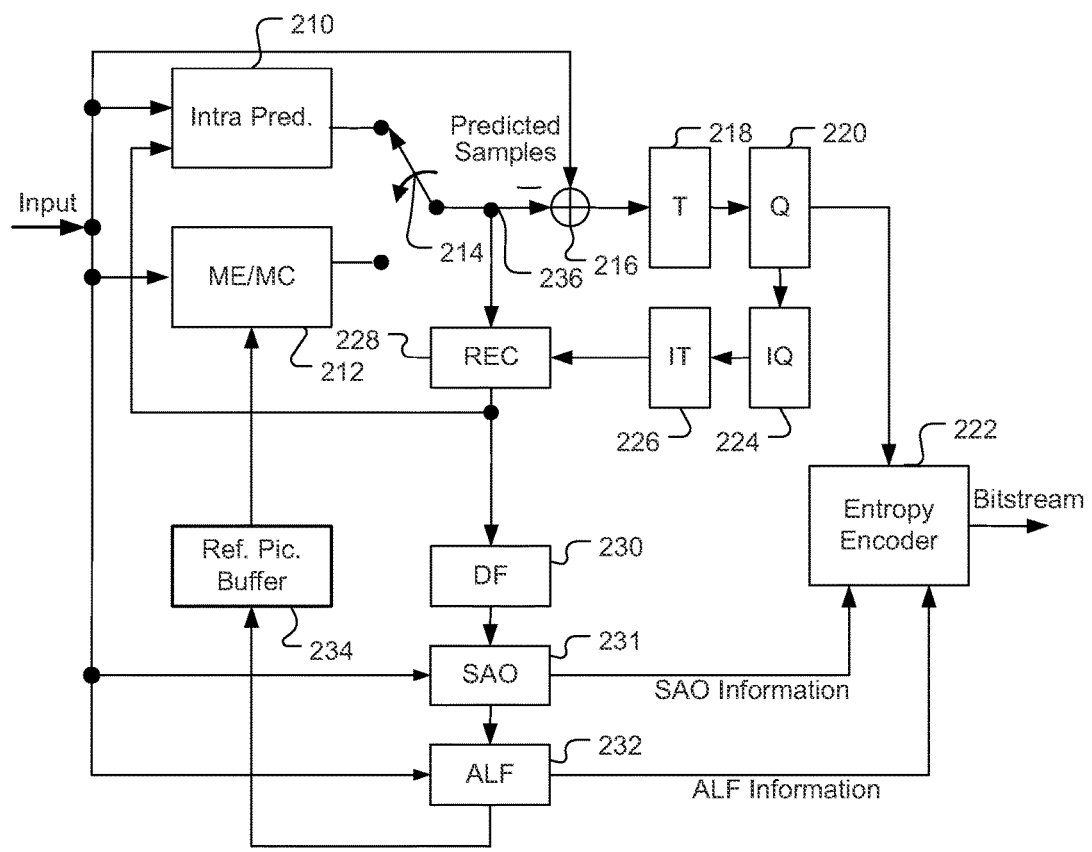
FIG. 2 illustrates an exemplary system block diagram of an encoder conforming to High Efficiency Video Coding (HEVC).
Figure 4:
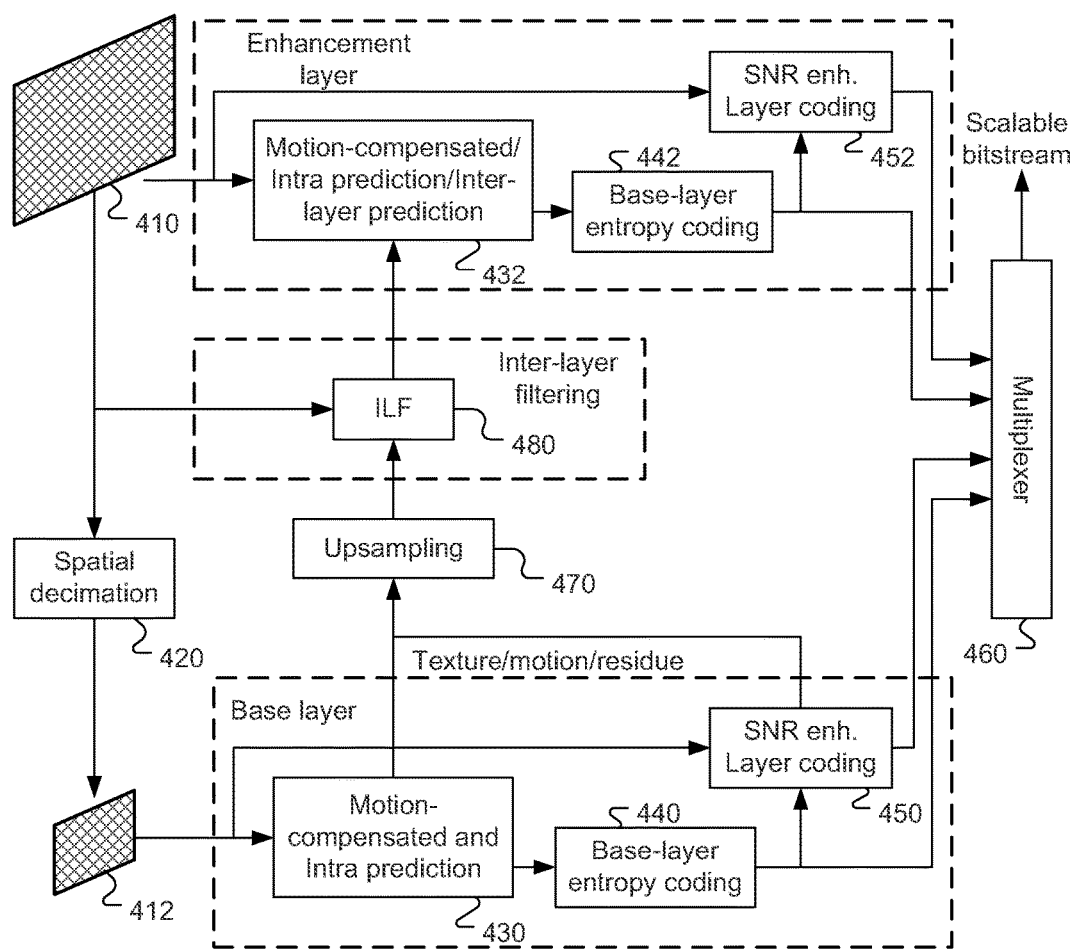
FIG. 4 illustrates a block diagram for an exemplary two-layer scalable video encoding system incorporating inter-layer filtering according to an embodiment of the present invention.

In the present invention, inter-layer filtering is disclosed for inter-layer texture prediction between a lower layer and an enhancement layer. For example, the inter-layer filtering can be applied to a two-layer coding system having a base layer and one enhancement layer. The use of the inter-layer filtering can reduce the difference between the up-sampled reconstructed BL picture and the original high resolution picture as shown in FIG. 4. Input picture 410 is processed by spatial decimation 420 to obtain resolution-reduced picture 412 (i.e., base layer picture). The layer-0 (i.e., base layer) coding process comprises motion-compensated and Intra prediction 430, base-layer entropy coding 440 and SNR enhancement layer coding 450. Similarly, the layer-1 (i.e., enhancement layer) coding process comprises motion-compensated and Intra prediction 432, base-layer entropy coding 442 and SNR enhancement layer coding 452. The compressed outputs from the base layer and the enhancement layer are multiplexed using multiplexer 460 to form a scalable bitstream. The data from the base layer is up-sampled using up-sampling 470 for enhancement layer coding. The exemplary inter-layer coding according to the present invention applies inter-layer filtering 480 before the base layer data is used by the enhancement layer coding. Furthermore, inter-layer filtering 480 as shown in FIG. 4 also utilizes data from input picture 410. The filter coefficients and related side information can be coded in the enhancement bitstreams or coded using separate entropy coding for inclusion by multiplexer 460 into the scalable bitstream.

An exemplary inter-layer process according to the present invention for scalable encoding is described as following:

Encoding the base layer video, where the base layer video is derived from the full-resolution input video using spatial decimation.

Reconstructing the base layer video and up-sampling it to the resolution of the enhancement layer, where reconstructing/up-sampling process can be performed on a block by block or quadtree basis.

Deriving filter coefficients for the inter-layer filtering according to a criterion, where the criterion may correspond to minimizing the difference between the up-sampled video and the original input video of the enhancement layer. The difference may be mean squared error. Examples are shown as follows.

The filter design may be based on the pixel classification which classifies the pixels based on the intensity. In this case, the filter design corresponds to band offset (BO) of sample adaptive offset (SAO) design in HEVC. The filter design may also classify the pixels based on the relationship between a current pixel and its neighboring pixels. In this case, the filter design corresponds to edge offset (EO) of SAO design in HEVC.

The filter design can be based on Wiener filter. In this example, the filter design corresponds to ALF design of HEVC.

The filter can be sequential application of SAO followed by the ALF.

Some information of SAO/ALF in the BL, such as offset type, offsets, region partition, On/Off decision, or Merge results for SAO, or filter adaptation mode, filter coefficients, filter footprint, region partition, On/Off decision, or Merge results for ALF can be shared or utilized to derive the information of SAO/ALF in the Inter-layer filtering.

Filtering the up-sampled video using the filter derived above and/or using the inter-layer filtered video by a fixed filter as reference for inter layer texture prediction. The inter layer texture prediction can be performed on a block, a region or a picture if the filtering can reduce the difference between the up-sampled lower layer and the original input video of the enhancement layer for the block, region or picture.

Selecting the prediction mode and encoding the inter-layer filter coefficients and the prediction residues of the enhancement layer video. Examples are shown as follows.

The inter-layer filter coefficients can be encoded in the bitstream, where the inter-layer filtering is performed on a block or quadtree basis.

An On/Off flag signaling can be coded for each block to indicate whether the current block in the up-sampled video is filtered by the inter-layer filtering.

The signaling of the inter-layer filtering can be slice based, LCU based or CU based.

The inter-layer filtering information can be shared or utilized by SAO/ALF in the enhancement layer.

Figure 5:
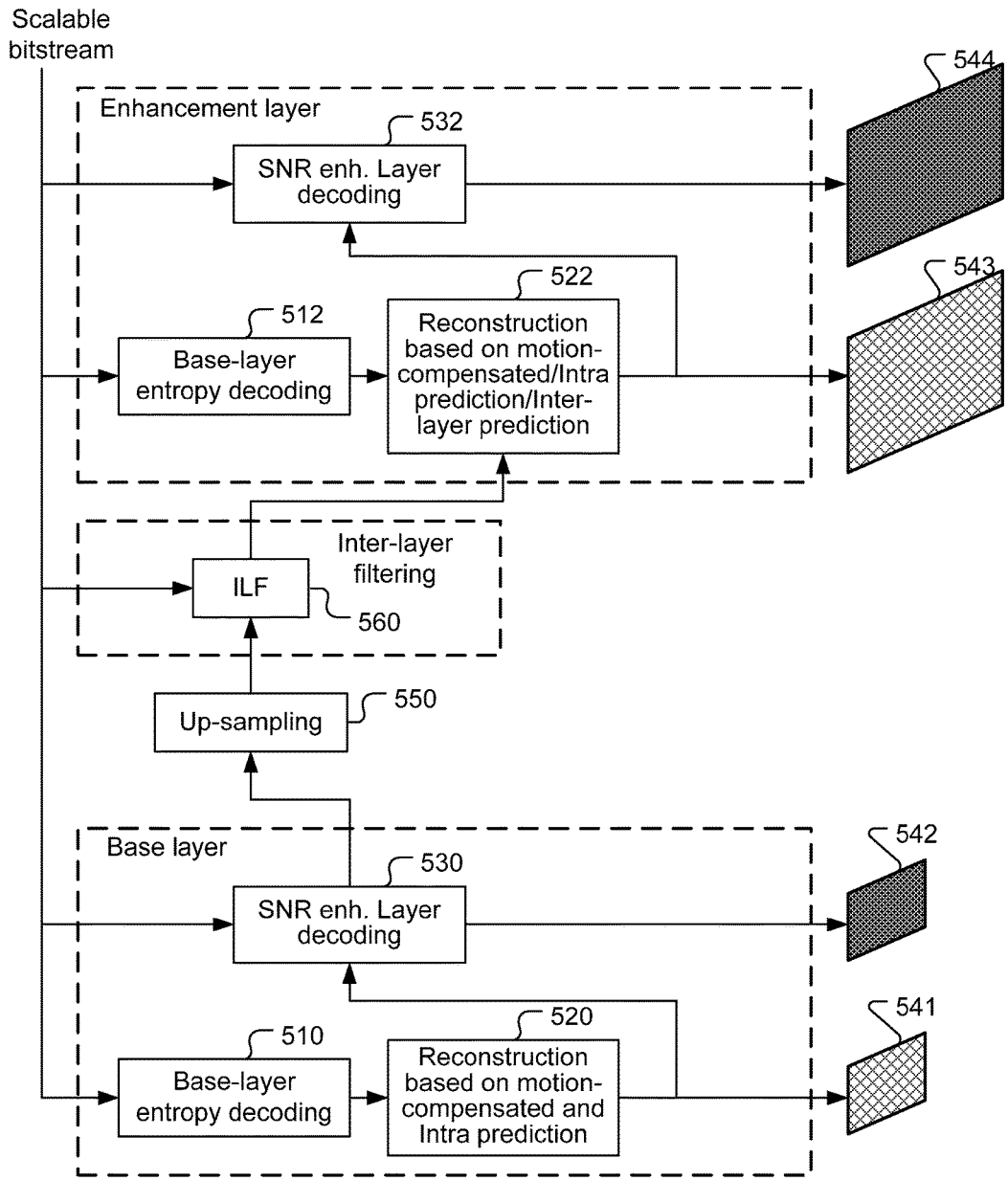
FIG. 5 illustrates a block diagram for an exemplary two-layer scalable video decoding system incorporating inter-layer filtering according to an embodiment of the present invention.

Exemplary decoding structure for two-layer scalable video coding incorporating an embodiment of the present invention is illustrated in FIG. 5. The decoder comprises a base layer decoder and an enhancement layer decoder. The base layer decoder comprises base-layer entropy decoding 510, reconstruction based on motion-compensated and Intra prediction 520 and SNR enhancement layer decoding 530. Similarly, the enhancement layer decoder comprises base-layer entropy decoding 512, reconstruction based on motion-compensated and Intra prediction 522 and SNR enhancement layer decoding 532. The reconstructed base layer video is up-sampled using up-sampling 550 and the up-sampled video is processed by inter-layer adaptive filtering 560 before it used for enhancement layer decoding. The base layer generates base-layer reconstructed video 541 and base-layer reconstructed SNR-enhancement video 542. The enhancement layer generates enhancement-layer reconstructed video 543 and enhancement-layer reconstructed SNR-enhancement video 544. According to the decoding structure of FIG. 5, the enhancement layer decoding can be applied as follows.

For each picture in the enhancement layer, the slice header and LCU header information are first decoded from a bitstream.

If the inter-layer filtering is enabled and is utilized by the current LCU, the corresponding blocks in the BL is decoded, reconstructed and up-sampled. The decoding process then goes to step 3. Otherwise, the decoding can use inter-layer motion prediction, residue prediction or normal HEVC like decoding process.

The inter-layer filter coefficients are decoded from the enhancement bitstream and the up-sampled video is filtered by the inter-layer filter accordingly.

The residue of the enhancement layer is decoded.

The residue of the enhancement layer is added on the filtered up-sampled BL video to generate the reconstructed output video.

The base layer coder and the enhancement layer coder may include in-loop filtering. For example, if HEVC-based coder is used for base layer and/or enhancement layer, the coder may include deblocking, SAO, ALF, or a combination of them. The inter-layer filtering for scalable coding system as disclosed above can also be applied to base layer and/or enhancement coder with in-loop filters.

While a two-layer scalable encoder and decoder are illustrated in FIG. 4 and FIG. 5 respectively, the present invention can also be applied to scalable video encoders and/or decoders with more than two layers.

Figure 6:
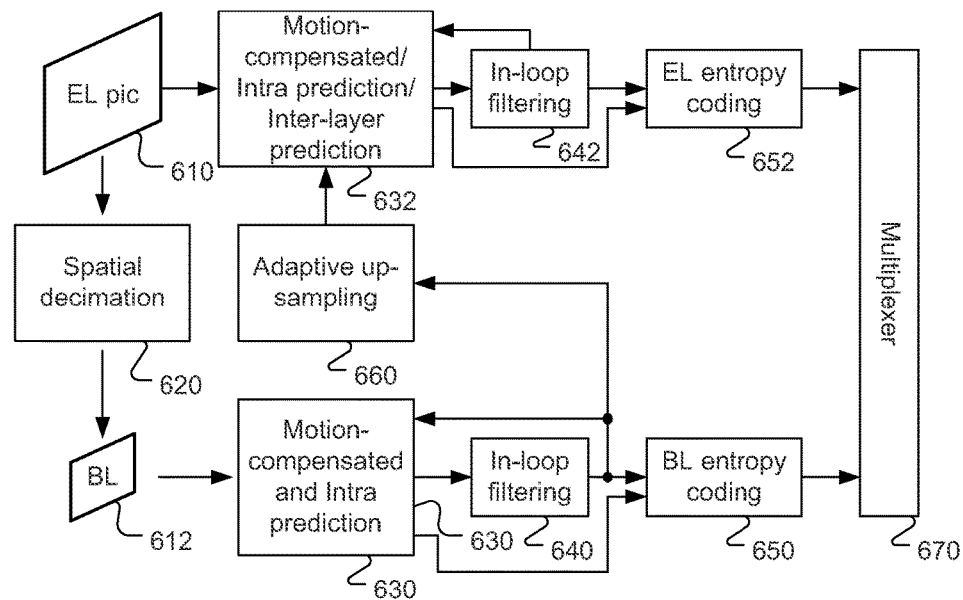
FIG. 6 illustrates a block diagram for an exemplary scalable video encoding system incorporating inter-layer filtering, where the inter-layer filtering is applied to the reconstructed base layer pixels after being in-loop filtering processed.

FIG. 6 illustrates an example of a two layer scalable video coding system where each layer includes in-loop filtering. Input picture 610 is down-sampled using spatial decimation 620 to generate base layer picture 612. Base layer picture is then processed by motion-compensated and Intra prediction 630. Coded symbols from motion-compensated and Intra prediction 630 are processed by BL entropy coding 650 to generate BL bitstream. Reconstructed BL video is processed by in-loop filtering 640 before it is up-sampled by up-sampling 660 for enhancement layer coding. Similarly, the enhancement layer picture is processed by motion-compensated and Intra prediction 632 and coded symbols from motion-compensated and Intra prediction 632 are processed by EL entropy coding 652 to generate EL bitstream. The BL bitstream and EL bitstream are multiplexed using multiplexer 670 to form a scalable bitstream. Reconstructed EL video is processed by in-loop filtering 642. The EL may also have the same resolution as the BL, i.e. in the case of quality (i.e. SNR) scalability. Furthermore, a scalable system may also include both spatial scalability and SNR scalability.

Figure 7:
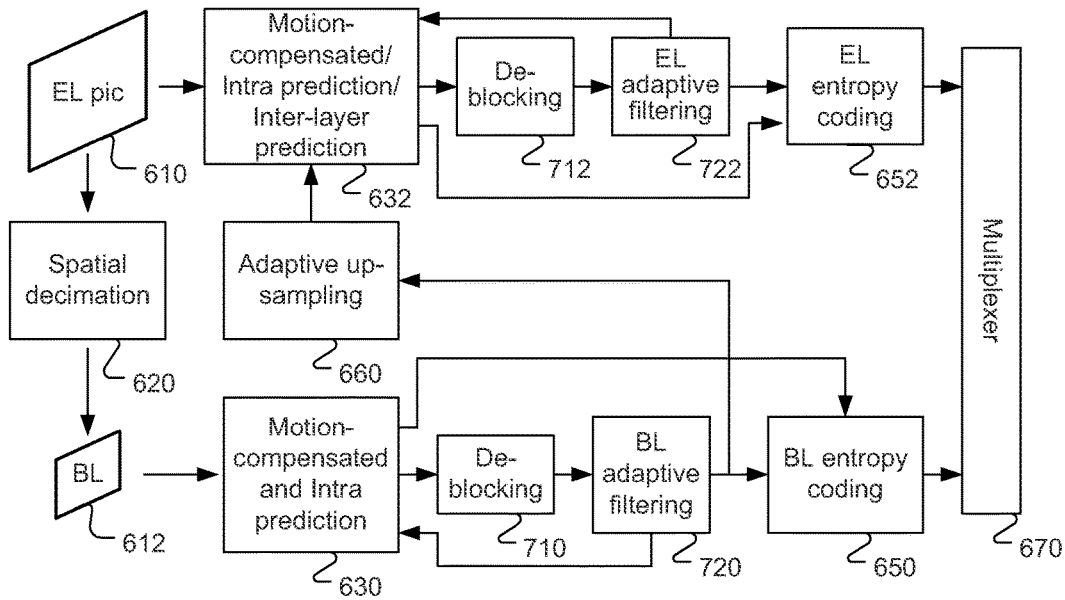
FIG. 7 illustrates a block diagram for an exemplary scalable video encoding system incorporating inter-layer filtering, where the inter-layer filtering is applied to the reconstructed base layer pixels after being de-blocking and BL adaptive filtering processed.

In some BL coding systems, such as in H.264/AVC based BL coding system, the In-loop filtering contains one processing module, i.e., in-loop deblocking. In the newly developed video coding standard HEVC, the in-loop filtering also include additional adaptive filtering such as sample adaptive offset (SAO) or adaptive loop filter (ALF). In the latter case, when the BL in-loop filtering contains more than one stage, there will be more design choices regarding where to obtain the BL from the reconstructed video data to apply the adaptive up-sampling. For example, FIG. 7 illustrates an example where in-loop filtering includes de-blocking 710 and BL adaptive filtering 720 in the base layer. The enhancement layer may also use similar coding structure having de-blocking 712 and BL adaptive filtering 722. The example in FIG. 7 illustrates the case that the base layer data is obtained from the output of BL adaptive filtering 720 to apply the adaptive up-sampling.

Figure 8:
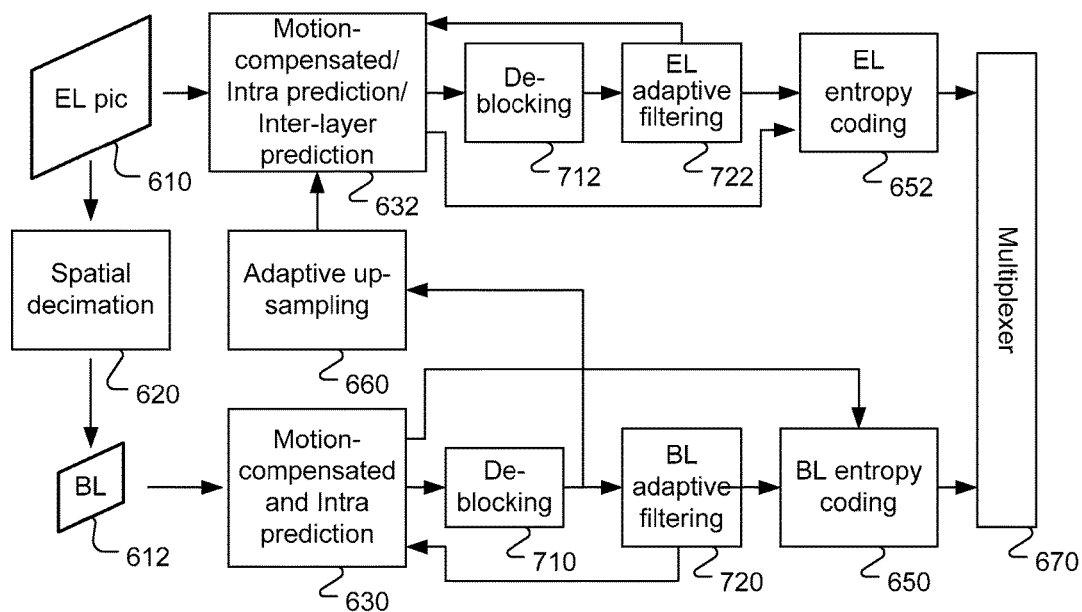
FIG. 8 illustrates a block diagram for an exemplary scalable video encoding system incorporating inter-layer filtering, where the inter-layer filtering is applied to the reconstructed base layer pixels after being de-blocking processed and before BL adaptive filtering processed.

In another example, the base layer data for inter-layer prediction is obtained from the output of BL de-blocking 710 as shown in FIG. 8. Again, while a two layer system is used as an example to practice an embodiment of the present invention, the present invention can be used in scalable coding systems with more than two layers. Furthermore, while the EL coder use the same structure as the BL coder in the above examples, the EL coder may have different coding structure. The EL video may also have the same spatial resolution as the BL video (i.e., SNR scalable system).

Figure 9:
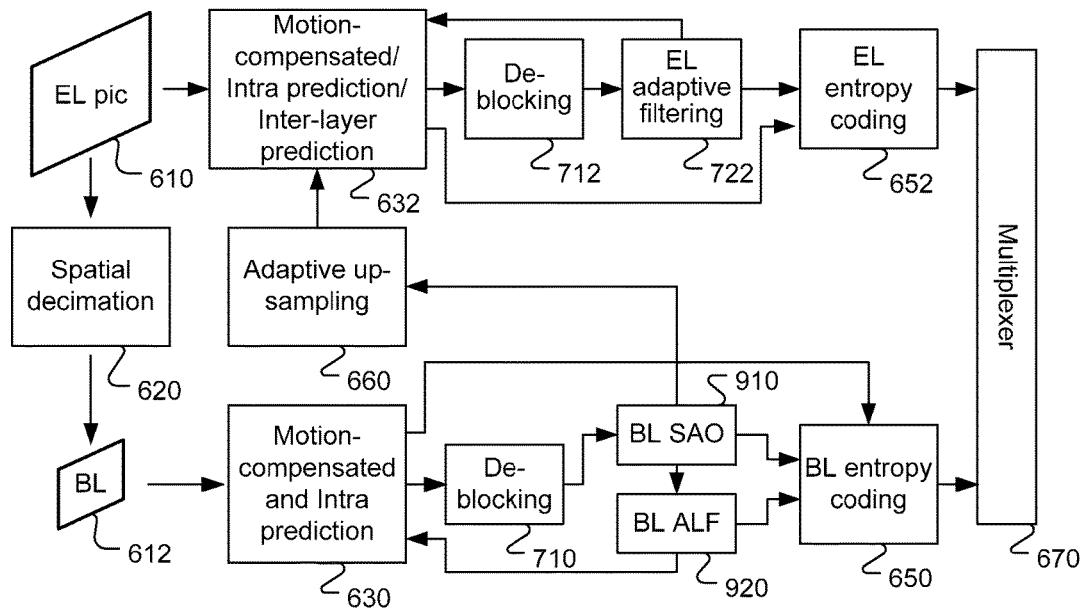
FIG. 9 illustrates a block diagram for an exemplary scalable video encoding system incorporating inter-layer filtering, where the inter-layer filtering is applied to the reconstructed base layer pixels after being de-blocking and BL SAO processed.
Figure 10:
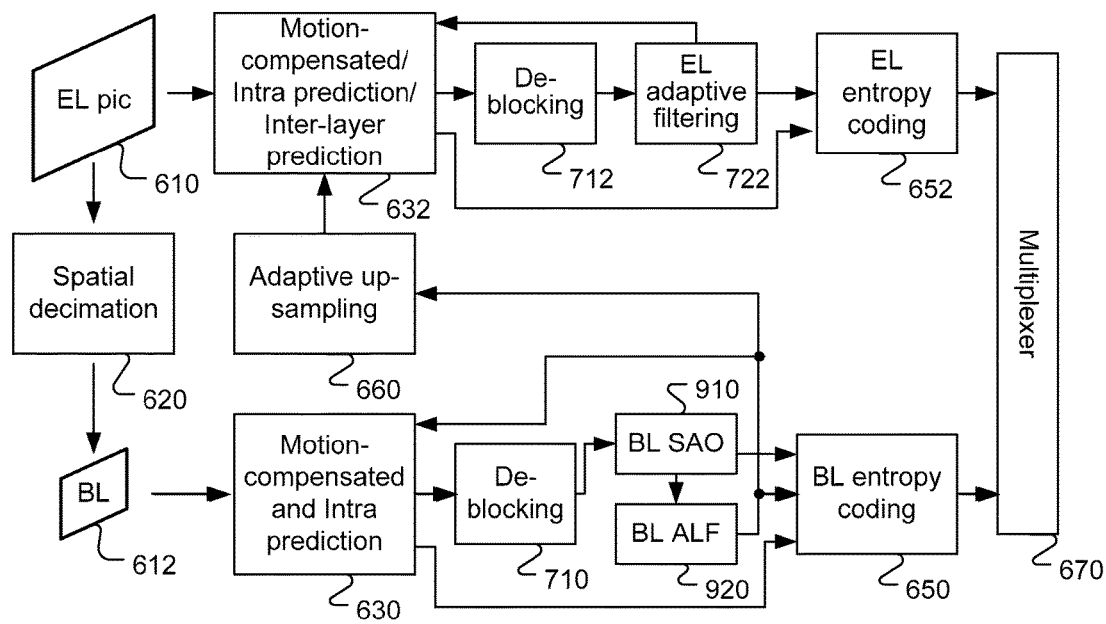
FIG. 10 illustrates a block diagram for an exemplary scalable video encoding system incorporating inter-layer filtering, where the inter-layer filtering is applied to the reconstructed base layer pixels after being de-blocking. BL SAO, and BL ALF processed.

As mentioned before, the adaptive filtering may include SAO and ALF. Accordingly, FIG. 9 illustrates an example where SAO 910 and ALF 920 are used in the base layer. The BL reconstructed pixels is processed by in-loop deblocking 710 and then by BL SAO 910. ALF 920 is applied to SAO processed BL video data. The base layer data for inter-layer coding is obtained from the output of BL SAO 910 and the data is up-sampled using adaptive up-sampling 660 before used for enhancement layer coding. FIG. 10 illustrates another arrangement of inter-layer coding according to an embodiment of the present invention. The base layer data for inter-layer coding is obtained from the output of BL ALF 920 and the data is processed using adaptive up-sampling 660 before used for enhancement layer coding.

Figure 11:
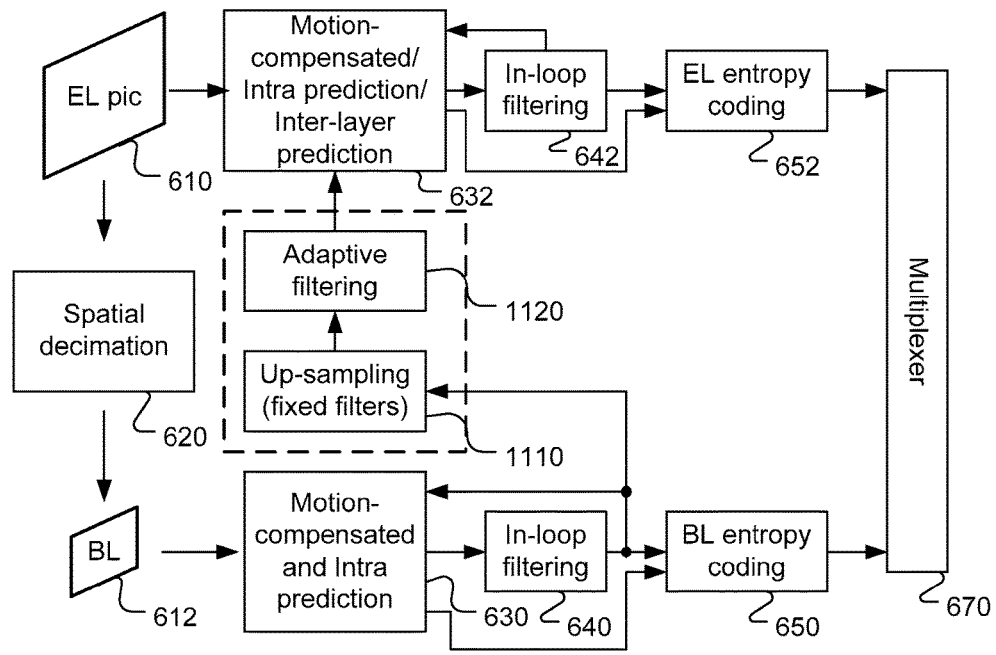
FIG. 11 illustrates a block diagram for an exemplary scalable video encoding system incorporating inter-layer filtering, where the inter-layer filtering comprises fixed up-sampling followed by adaptive filtering.

Another scalable coding structure with inter-layer filtering is shown in FIG. 11. The system is similar to the system in FIG. 6. However, the adaptive up-sampling is implemented based on up-sampling with fixed filters 1110 followed by adaptive filtering 1120. In this case, the reconstructed BL pixels are processed by in-loop filtering 640 and then up-sampled using up-sampling with fixed filters 1110. The fixed filters may correspond to 8-tap DCT-IF (DCT Interpolation Filter, as used in HEVC). After up-sampling with fixed filters, the up-sampled pixels are filtered using adaptive filtering 1120 to reduce the errors (i.e., differences) between up-sampled pixels and original EL pixels. The adaptive filter coefficients are coded and included in the bitstream so that the decoder can decode and derive the adaptive filter coefficients. The filter coefficients of the fixed filters 1110 are pre-defined and known to the decoder. Therefore, there is no need to transmit the filter coefficient information of the fixed filters 1110 in the bitstream. While adaptive filter 1120 and up-sampling with fixed filters 1110 are shown as two sequential processing stages for a scalable encoder, these two processing stages can be combined into one in the decoder side. A single filter can be used to provide the equivalent filtering of cascading two filters, i.e., the up-sampling with fixed filter followed by adaptive filter. Accordingly, the adaptive filter coefficients decoded from the bitstream can be combined with the fixed filter coefficients to form a single joint filter. Then the combined coefficients are applied to the reconstructed BL pixels for use by the enhancement layer coding. Therefore, only single filtering is applied to the pixels associated with the BL data and the computational complexity at the decoder can be reduced. In FIG. 11, the BL video data for inter-layer prediction is derived from the output of in-loop filtering 640. However, in-loop filtering 640 may have various filtering structure as shown in FIG. 7 through FIG. 10. The BL video data for inter-layer prediction may also be derived from the different processed BL data as shown in FIG. 7 through FIG. 10.

Figure 12:
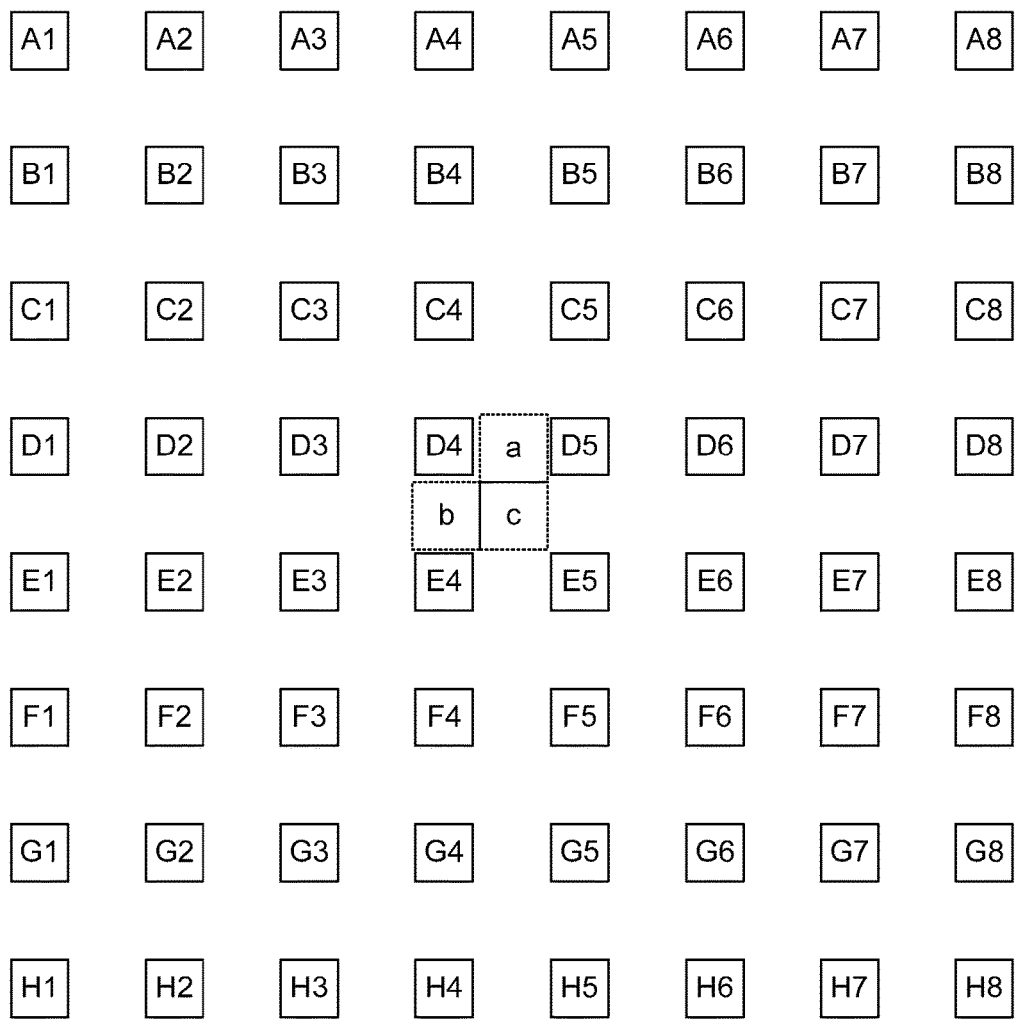
FIG. 12 illustrates an example of pixel locations in the up-sampled BL after 2× up-sampling.
Figure 13:
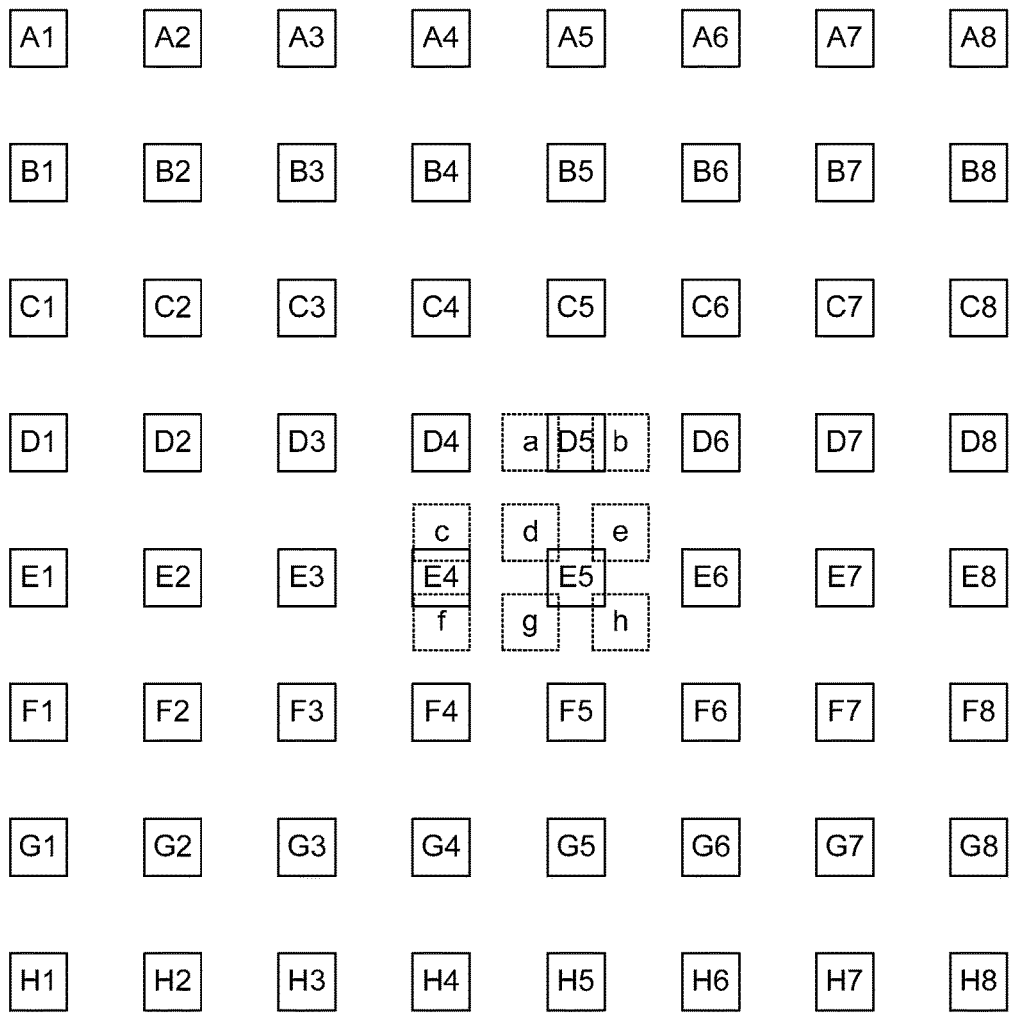
FIG. 13 illustrates an example of pixel locations in the up-sampled BL after 1.5× up-sampling.

The up-sampling process will result in more pixels in the up-sampled video data. Some up-sampled pixels will be located at locations where original pixels exist. Some up-sampled pixels correspond to newly created pixels (termed as interpolated pixels) that are not aligned with original pixel locations in the up-sampled space. FIG. 12 illustrates an example of 2× up-sampling (i.e., 1:2 up-sampling horizontally and vertically), where the locations with capital letters indicate the locations where original pixels exist (i.e., collocated pixels). The locations with lower-case letters indicate locations corresponding to newly created pixels (i.e., non-collocated pixels). For example, pixel D4 corresponds to an original pixel location and pixel D4 is a collocated pixel. Neighboring pixels a, b and c around pixel D4 correspond to locations of interpolated pixels (i.e., non-collocated pixels). FIG. 13 illustrates an example of 1.5× up-sampling (i.e., 1:1.5 or 2:3 up-sampling), where D4, D5, E4 and E5 corresponds to original pixel locations. However, among D4, D5, E4 and E5, only D4 has a corresponding collocated pixel in the EL. Therefore, only D4 is a collocated BL pixel. Neighboring pixels a, b, c, d, e, f, g and h correspond to locations of interpolated pixels and they correspond to non-collocated pixels in the up-sampled BL video data.

In order to derive pixel values at up-sampled locations, filtering is applied to the reconstructed pixels in the BL (i.e. the pixels denoted by capital letters in FIG. 12 and FIG. 13). For 2× up-sampling, every BL reconstructed pixel corresponds to an EL pixel. In other words, every location with a capital letter has a collocated pixel at the EL. Therefore, for 2× up-sampling, the filtering is performed for every BL location and the filtering operates on neighboring pixels that may include the underlying pixel. However, for 1.5× up-sampling, some of the BL locations do not have collocated pixels in the EL. As mentioned before, while D4 has a collocated EL pixels, pixel locations at D5, E4 and E5 ado not have collocated EL pixels. Therefore, filtering is only applied D4, and D5, E4 and E5 are not filtered. Furthermore, pixels D5, E4 and E5 are not used for filtering collocated pixels. In other words, filtering on D4 may use pixels at B4, F4, D2, D6, etc. In one embodiment, a 5×5 diamond shape filter as shown in FIG. 14A is used for filtering collocated BL pixels. The 5×5 filter is a two-dimensional (2-D) non-separable symmetric filter, represented by six distinct filter coefficients, $\{h_i\}$, i=1, ..., 6. In other embodiments, a 7×7 diamond filter (indicated by the shaded area) or a 9×9 diamond symmetric filter as shown in FIG. 14B is used. Furthermore, a (2N+1)×(2N+1) diamond symmetric filter can be used. The number of distinct coefficients for representing a (2N+1)×(2N+1) diamond symmetric filter is (N+1)×(N+2)/2. In another embodiment, the filter is a 9×7 (or an M×N filter) 2-D non-separable symmetric filter, that is the same as the ALF in HEVC. Ten coefficients are needed for representing the 9×7 filter.

After all collocated BL pixels are filtered, interpolation can be operated on these filtered collocated BL pixels to generated up-sampled non-collocated pixels. Alternatively, interpolation may also be performed on these collocated BL pixels before these pixels are filtered. For the up-sampled pixels that do not have collocated BL pixels (i.e., non-collocated pixels), interpolation filtering is applied to collocated BL pixels to generate the up-sampled non-collocated pixels. Embodiments according to the present invention classify the up-sampled non-collocated pixels into location types based on the locations. For example, in the case of 2× up-sampling case as shown in FIG. 12, interpolated pixels at location corresponding to "a" are classified into first location type, interpolated pixels at location corresponding to "b" are classified into second location type, and interpolated pixels at location corresponding to "c" are classified into third location type. Interpolated pixels at location corresponding to "a" are generated by applying adaptive 2N-tap 1-D symmetric filter on pixels $\{X_i\}$, i=1, . . . , 2N, where $\{X_i\}$ corresponds to collocated row pixels that are in the same row as "a". $X_i$ corresponds to $D_i$ for the "a" location shown in FIG. 12. In other words, up-samples pixels at location corresponding to "a" are interpolated based on the BL pixels in a collocated row. The interpolated pixel value "a" is calculated according to equation (1).

$$a = \sum_{i=1}^{2N} h_i \times X_i \quad (1)$$

Due to the symmetry, the following relationship for $h_i$ exists, $$h_i = h_{2N+1-i}, i=1, \ldots, N. \quad (2)$$

In one embodiment, N is chosen to be 4 and then "a" is calculated by applying 8-tap filters on $\{X_1, \ldots X_8\}$, where 4 distinct coefficients $\{h_1, \ldots h_4\}$ are required.

Similarly, pixel "b" are generated by applying adaptive 2N-tap I-D symmetric filter on BL collocated pixels in the same column. If N is chosen to be 4, then "b" is calculated by applying an 8-tap filter on $\{A_i, B_i, C_i, D_i, E_i, F_i, G_i, H_i\}$ as shown in equation (3), where i is the index of column pixels that "b" is collocated with. For the "b" location shown in FIG. 12, i corresponds to 4. In other words, up-sampled pixels at location corresponding to "b" are interpolated based on the BL pixels in the collocated column. The filter coefficients are the same as the 1-D filter coefficients that are used to calculate "a" due to the symmetry.

$$b = h_i \times A_i + h_2 \times B_i + h_3 \times C_i + h_4 \times D_i + h_4 \times E_i + h_3 \times F_i + h_2 \times G_i + h_i \times H_i \quad (3)$$

On the other hand, pixel "c" is generated by applying 2N-tap 2-D non-separable symmetric to its neighboring 2N×2N BL collocated pixels. For example, neighboring pixels from $A_1$ to $H_8$ as shown in FIG. 12 can be used to derive pixel "c", if N is chosen to be 4. If the BL collocated pixels are represented by $P_{ij}$, c can be calculated as in equation (4).

$$c = \sum_{i=1}^{2N} \sum_{j=1}^{2N} h_{i,j} \times P_{i,j} \quad (4)$$

Due to the symmetry of coefficients $h_{i,j}$, the following relationship exists, $$h_{i,j} = h_{2N+1-i,j} = h_{i,2N+1-j} = h_{j,i} \quad (5)$$

Therefore, N×(N+1)/2 coefficients are required to represent the 2N×2N 2-D non-separable symmetric filter. In summary, for 2× up-sampling in the 2× scalability case, three types of filters are needed for filtering pixels in three types of positions (i.e., "a", "b" and "c"), for each of Y, Cb and Cr color component. In another embodiment, Cb and Cr may share the filter coefficients for the same type of filter.

For 1.5× up-sampling in the 1.5× spatial scalability case, as shown in FIG. 13, pixels in position "a" and "b" are generated by the BL collocated pixels in the same row, e.g. D2, D4, D6, D8, etc. BL reconstructed pixels that do not have collocated pixels in EL, such as D1, D3, D5 and D7 are not used for interpolating lowercase letter pixels. Similarly, pixels in position "c" and "f" are generated by the BL collocated pixels in the same column, e.g. B4, D4, F4, H4, etc. BL reconstructed pixels that do not have collocated pixels in EL, such as A4, C4, E4 and G4 are not used for interpolating lowercase letter pixels (i.e., non-collocated pixels). For 2× up-sampling, every BL reconstructed pixel has a collocated pixel at the EL. In other words, the locations with capital letters are also pixel locations at the EL. However, for 1.5× up-sampling, some of the BL reconstructed pixels are not used as pixel locations in the EL. For example, while D4 is used as one pixel at the EL, pixel locations at D5, E4 and E5 are not used as pixels at the EL.

For 1.5× up-sampling, there are 8 location types, i.e., "a" through "h". For "a" and "b", they are interpolated based on collocated row pixels in the BL. For "c" and "f", they are interpolated using collocated column pixels in the BL. Interpolation for pixel locations corresponding to "a", "b", "c" and "f" are calculated using 2N-tap 1-D filter according to equations (6)-(9):

$$a = \sum_{j=1}^{2N} h_j^a \times P_j^a \quad (6)$$

$$b = \sum_{j=1}^{2N} h_j^b \times P_j^b, \quad (7)$$

$$c = \sum_{u=1}^{2N} h_i^c \times P_i^c, \text{ and} \quad (8)$$

$$f = \sum_{i=1}^{2N} h_i^f \times P_i^f, \quad (9)$$

where $P_j^a$ corresponds column pixels collocated with "a" in the BL, $P_j^b$ corresponds column pixels collocated with "b" in the BL, $P_i^c$ corresponds row pixels collocated with "c" in the BL, and, $P_i^f$ corresponds row pixels collocated with "f" in the BL.

Due to the symmetry, the following relationship exists, $$h_j^a = h_{2N+1-j}^b = h_i^c = h_{2N+1-i}^f \quad (10)$$

Therefore, a total number of 2N coefficients are required for generating interpolated values at locations corresponding to "a", "b", "c" and "f".

Pixels at locations corresponding to "d", "e", "g" and "h" are generated by applying a 2N×2N 2-D non-separable symmetric filter to its neighboring 2N×2N collocated pixels in the BL, as illustrated in equations (11)-(14):

$$d = \sum_{i=1}^{2N} \sum_{j=1}^{2N} h_{i,j}^d \times P_{i,j}^d, \quad (11)$$

$$e = \sum_{i=1}^{2N} \sum_{j=1}^{2N} h_{i,j}^e \times P_{i,j}^e, \quad (12)$$

$$g = \sum_{i=1}^{2N} \sum_{j=1}^{2N} h_{i,j}^g \times P_{i,j}^g, \text{ and} \quad (13)$$

$$h = \sum_{i=1}^{2N} \sum_{j=1}^{2N} h_{i,j}^h \times P_{i,j}^h. \quad (14)$$

Due to the symmetry, the following relationship exists, $$h_{i,j}^d = h_{j,i}^d, \quad (15)$$

$$h_{i,j}^e = h_{j,i}^e, \quad (16)$$

$$h_{i,j}^g = h_{j,i}^g, \quad (17)$$

$$h_{i,j}^h = h_{j,i}^h, \text{ and} \quad (18)$$

$$h_{i,j}^d = h_{i,2N+1-j}^e = h_{2N+1-i,j}^g = h_{2N+1-i,2N+1-j}^d \quad (19)$$

Therefore, N×(2N+1) coefficients are required for interpolating pixels at locations corresponding to "d", "e", "g" and "h".

In summary, for 1.5× up-sampling for the 1.5× spatial scalability case, a total of 8 location types are identified to generate the interpolated pixels, i.e., "a" through "h". Among them, two have collocated row pixels, two have collocated column pixels, and four do not have any collocated row pixels or column pixels. Furthermore, for each of Y, Cb and Cr color components, individual filters are design.

In another embodiment, Cb and Cr may share the filter coefficients for the same location type.

In the case of SNR scalability, only collocated pixels in the BL are filtered. Therefore only one type of filter is required for each of Y, Cb and Cr color component. In one embodiment, a symmetric diamond shaped filter as shown in FIG. 14A and FIG. 14B is used. Furthermore, chrominance components Cb and Cr may share the same filter coefficients.

The filter coefficients ("$h_{i,j}$" or "$h_i$") in the above equations can be determined using known methods in the art, such as the Wiener filter design. In Wiener filter design, the differences between the EL original pixels and the filtered results of the BL reconstructed pixels in a least square sense, where the filter is applied to the BL pixels at collocated positions.

The inter-layer adaptive filtering according to the present invention can be applied at a picture level. In this case, the coefficients are derived from all pixels in one picture. The inter-layer adaptive filtering according to the present invention can be applied at a region (i.e., sub-picture) level. In this case, the coefficients are derived from all pixels in a region. The region can be a set of LCUs, a slice or a group of slices, a tile or a group of tiles, etc.

When the inter-layer adaptive filtering is used, the filter coefficients may be adapted to a picture or a region. Accordingly the filter coefficients may have to be transmitted in the bitstream so that a decoder may recover the filter coefficients and apply the inter-layer filtering. In one embodiment, the filter coefficients are entropy coded and the coded filter coefficients are signaled in picture parameter set (PPS) or adaptation parameter set (APS, if available). On/Off flags of all regions (e.g., LCUs) in a slice can be entropy coded and the coded On/Off flags can be signaled in the slice header to specify whether adaptive filtering (i.e., flag=On) or fixed filtering (i.e., flag=Off) is used for each LCU in the slice. FIG. 15 illustrates an example of syntax structure where inter-layer filter coefficients are signaled in the APS level and the inter-layer filtering On/Off control flags are signaled in the slice header.

In another embodiment of the present invention, both the filter coefficients and the inter-layer filtering On/Off flags for the regions (i.e., LCU) are entropy coded and the coded On/Off flags are signaled in the slice header to specify whether adaptive filtering (i.e., flag=On) or fixed filtering (i.e., flag=Off) is applied to each LCU in this slice as shown in FIG. 16.

In yet another embodiment, the filter coefficients are entropy coded and the coded filter coefficients are signaled in the slice header. The LCU On/Off flags are entropy coded and the coded flags are signaled in each LCU syntax to specify whether adaptive filtering (On) or fixed filtering (Off) is apply to each LCU in this slice.

A flag (e.g. "adaptive_upsample_enabled_flag") can be signaled in sequence parameter set (SPS) to specify whether adaptive up-sampling is applied to the sequence. If adaptive up-sampling is not applied, then fixed up-sampling filters (known to both encoder and decoder) are used. A flag (e.g. "adaptive_upsample_enabled_flag") can be also signaled in picture parameter set (PPS) to specify whether adaptive up-sampling is applied to this picture. In this case, if the SPS flag, "adaptive_upsample_enabled_flag" is enabled, the picture flag, "pic_adaptive_upsample_enabled_flag" is coded. When both flags are enabled, then adaptive up-sampling is applied to this picture. Otherwise fixed up-sampling filters (known to both the encoder and decoder) are used.

Figure 17:
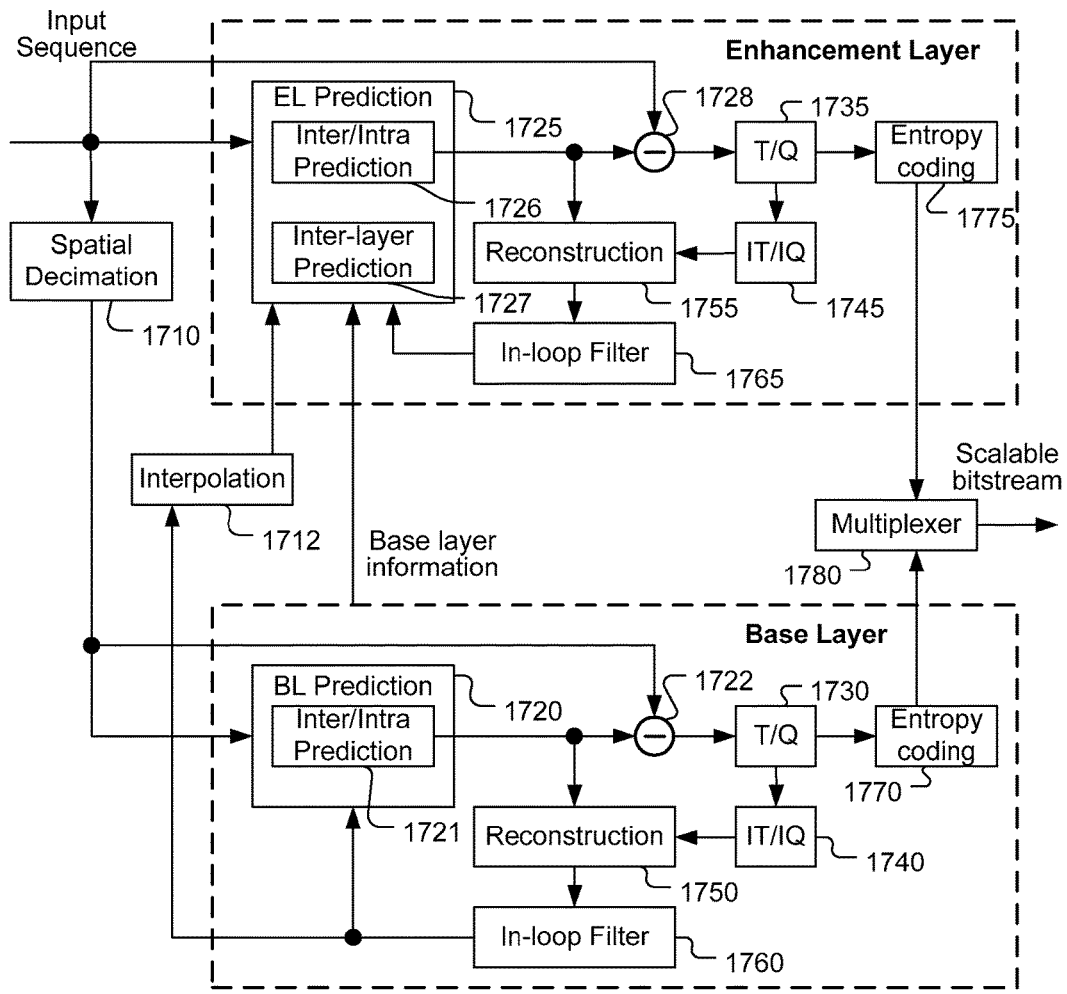
FIG. 17 illustrates a block diagram of an exemplary two-layer scalable video encoding system incorporating inter-layer filtering, where the inter-layer filtering corresponds to interpolating the BL video data derived from reconstructed BL video data.

In the scalable video coding (SVC) system, the enhancement layers can be predicted from the lower layer pictures and previously encoded enhancement-layer pictures. The inter-layer prediction is a useful tool for spatial scalability. The inter-layer prediction process comprises identifying the collocated block in the lower layer (e.g. BL) based on the location of a corresponding EL block and interpolating the collocated lower layer block to generate prediction samples for the EL as shown in FIG. 17. In scalable video coding, the interpolation process is used for inter-layer prediction by using predefined coefficients to generate the prediction samples for the EL based on the lower layer pixels. The example in FIG. 17 consists of two layers. However, an SVC system may consist of more than two layers. The BL picture is formed by applying spatial decimation 1710 to the input picture (i.e., an EL picture in this example). The BL processing comprises BL prediction 1720. The BL input is predicted by BL prediction 1720, where subtractor 1722 is used to form the difference between the BL input data and the BL prediction. The output of subtractor 1722 corresponds to the BL prediction residues and the residues are processed by transform/quantization (T/Q) 1730 and entropy coding 1770 to generate compressed bitstream for the BL. Reconstructed BL data has to be generated at the BL in order to form BL prediction. Accordingly, inverse transform/inverse quantization (IT/IQ) 1740 is used to recover the BL residues. The recovered BL residues and the BL prediction data are combined using reconstruction 1750 to form reconstructed BL data. The reconstructed BL data is processed by in-loop filter 1760 before it is stored in buffers inside the BL prediction. In the BL, BL prediction 1720 uses Inter/Intra prediction 1721. The EL processing consists of similar processing modules as the BL processing. The EL processing comprises EL prediction 1725, subtractor 1728, T/Q 1735, entropy coding 1775, IT/IQ 1745, reconstruction 1755 and in-loop filter 1765. However, the EL prediction also utilizes reconstructed BL data as inter-layer prediction. Accordingly, EL prediction 1725 comprises inter-layer prediction 1727 in addition to Inter/Intra prediction 1726. The reconstructed BL data is interpolated using interpolation 1712 before it is used for inter-layer prediction. The compressed bitstreams from the BL and the EL are combined using multiplexer 1780.

Figure 18:
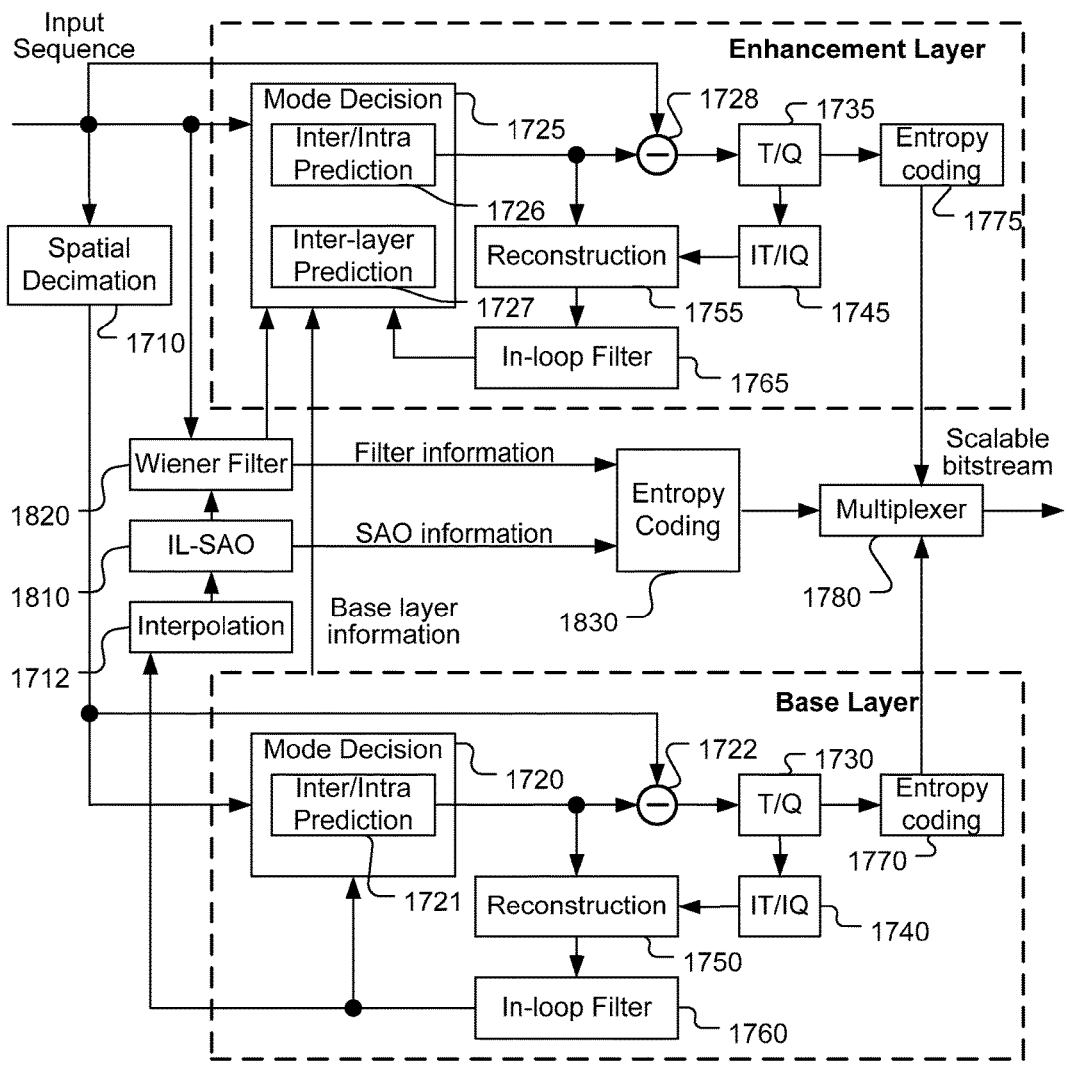
FIG. 18 illustrates a block diagram for an exemplary two-layer scalable video encoding system incorporating inter-layer filtering, where the inter-layer filtering comprises interpolation, inter-layer SAO and Wiener filter.

An SVC system using inter-layer prediction according to an embodiment of the present invention is illustrated in FIG. 18. After the reconstructed BL data is interpolated, the distortion or artifacts in the interpolated samples can be alleviated by using adaptive filtering techniques such as sample adaptive offset (SAO). The system shown in FIG. 18 is similar to the system in FIG. 17. Therefore, the same processing modules in FIG. 17 and FIG. 18 are labeled with the same reference numbers. As shown in FIG. 18, the interpolated samples from interpolation 1712 are processed by inter-layer SAO (IL-SAO) 1810 and Wiener filter 1820 before the samples are provided for inter-layer prediction.

The interlayer SAO (IL-SAO) processing is described as follows. First, SAO classifies pixels into categories and calculates the average offset between enhancement layer source pixels and the interpolated base-layer pixels in each category. After the offset values are obtained, SAO adds these offset values to the base-layer pixels. Note that IL-SAO processed base-layer pixels for prediction can be further processed by other filter such as Wiener filter 1820 in FIG. 18.

As mentioned earlier, SAO supports two types of pixel classification methods including band offset (BO) and edge offset (EO). These classifiers categorize pixels into several categories and each category has its own offset value. The derived offset values will be added to the pixels in respective categories. The offset values have to be signaled in the bitstream so that the information can be recovered at the decoder side. In order to achieve better performance in terms of rate-distortion cost, the offset values of all categories can be divided into groups and only the offset values in the group with best rate-distortion cost are encoded in the bitstream.

To further reduce the picture distortion, SAO can use local adaptation. For example, a picture can be divided into multiple small regions/partitions and each region may have its own SAO parameter set including offset values and type of pixel classification method. The region partition can use quadtree partitioning for the picture as shown in FIG. 19 or use coding tree block size as partition size. In the example of FIG. 19, the upper left block uses the BO type, the upper right block does not use any SAO (i.e., OFF type), the lower left block uses the EO type. The lower right block is further divided into second-level sub-blocks. Two left sub-blocks use the EO type, the upper right sub-block uses the BO type, and the lower right sub-block does not use any SAO (i.e., OFF type).

The inter-layer Band Offset (IL-BO) may be used to classify each pixel according to its intensity and intensity range is equally divided into M bands similar to the approach used in the HEVC standard. The bands are organized into 4-band sets, where each 4-band set consists of 4 consecutive bands. The encoder encodes the starting band position and four offsets of the selected 4-band set in the bitstream. The decoder extracts the starting band position and four offsets from the bitstream in order to perform BO-based SAO.

The inter-layer Edge Offset (IL-EO) may be used to classify all pixels of a region into multiple categories by comparing each pixel with its neighboring pixels similar to the EO used in HEVC, as shown in FIG. 3. When IL-EO is used, one of the four 1-D patterns (i.e., 0°, 45°, 90° and 135° EO) can be chosen for pixel classification. Since each 1-D pattern only uses two neighboring pixels, the number of operations is low. The IL-EO classification rule is shown in Table 1. The encoder encodes the edge offset classification pattern index and four offsets in the bitstream. The decoder extracts the edge offset classification pattern index and four offsets from the bitstream.

Syntax elements associated with IL-SAO can be signaled in the bitstream to provide information or control related to IL-SAO. For example, the inter-layer SAO enable/disable flag can be encoded or decoded in the bitstream. This flag can be incorporated in sequence parameter set (SPS), picture parameter set (PPS), adaptation parameter set (APS), slice header, region level, or coding tree block level. For example, syntax element interlayer_sample_adaptive_offset_flag can be used to specify whether inter-layer SAO is applied or not to the current picture. Syntax element interlayer_sao_flag_cb may be used to indicate whether inter-layer SAO is applied to color component Cb, where a value of 1 denotes SAO is applied to the Cb component in the base layer and a value of 0 denotes SAO is not applied to the Cb component in the base layer. Similarly, syntax element interlayer_sao_flag_cr can be used for the Cr color component. Syntax element interlayer_sao_split_flag [cIdx][saoDepth][ry][rx] can be used to specify whether a region is split into four equal sub-regions. The array indices rx and ry specify the current region of current saoDepth, and the array index cIdx specifies the component. When sao_split_flag [cIdx][saoDepth][ry][rx] is not present, it is inferred as 0. Syntax element interlayer_sao_type_idx specifies whether the selected inter-layer SAO type (i.e., BO or EO). Syntax element interlayer_sao_offset specifies the offset value to be encode/decoded in the bitstream. Syntax element interlayer_band_position specifies the starting band position for inter-layer band offset. An exemplary syntax design for interlayer_sao_param( ) is shown in FIG. 20. An exemplary syntax design for interlayer_sao_split_param( ) is shown in FIG. 21. An exemplary syntax design for interlayer_sao_offset_param( ) is shown in FIG. 22.

Figure 23:
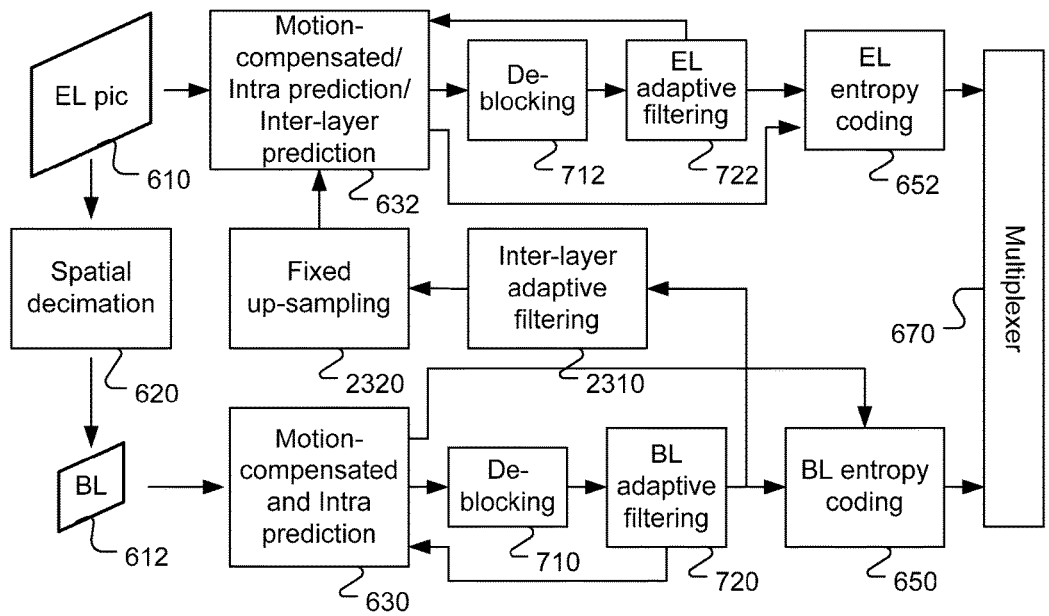
FIG. 23 illustrates a block diagram for an exemplary two-layer scalable video encoding system incorporating inter-layer filtering, where the inter-layer filtering comprises inter-layer adaptive filtering followed by fixed up-sampling.

In FIG. 11, a scalable video coding system incorporating an inter-layer filtering according to an embodiment of the present invention is shown. The inter-layer filtering is implemented as fixed up-sampling 1110 followed by adaptive filtering 1120. FIG. 23 illustrates an alternative system configuration where inter-layer filtering comprises inter-layer adaptive filtering 2310 and fixed up-sampling 2320. The inter-layer filtering is applied to reconstructed BL signal processed by de-blocking 710 and BL adaptive filtering 720 (e.g., SAO) in the BL. Fixed up-sampling 2320 will generate the pixels at the interpolation positions associated with the EL. The filtered BL (or lower resolution layer) pixels and the interpolated pixels are used to predict the EL signal (or higher resolution layer) content. In FIG. 23, the filtered BL (or lower resolution layer) pixels are passed to the EL through fixed up-sampling 2320. However, the filtered BL (or lower resolution layer) pixels may also be passed to the EL explicitly. As mentioned before that the EL can also be the same spatial resolution as the BL, i.e. in the case of quality (i.e. SNR) scalability. For SNR scalability, the filtered BL pixels are processed by the inter-layer adaptive filtering and then used to predict the EL data. In this case, there is no up-sampling filtering required.

Figure 24:
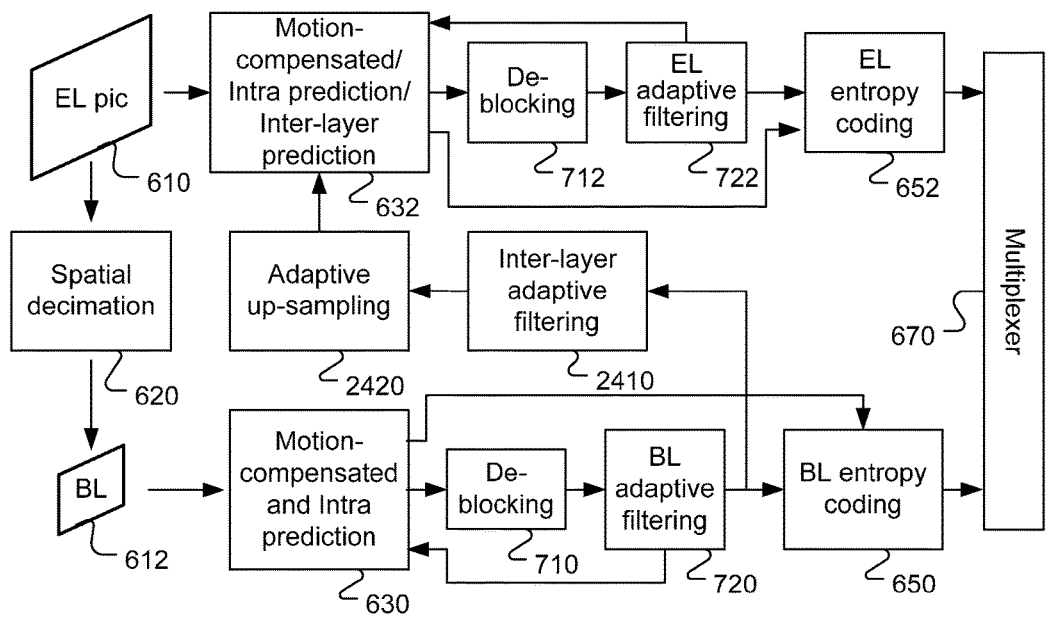
FIG. 24 illustrates a block diagram for an exemplary two-layer scalable video encoding system incorporating inter-layer filtering, where the inter-layer filtering comprises inter-layer adaptive filtering and adaptive up-sampling.

FIG. 24 illustrates another system configuration where inter-layer filtering comprises inter-layer adaptive filtering 2410 and adaptive up-sampling 2420. The inter-layer filtering is applied to reconstructed BL signal processed by in-loop filtering 710 (e.g., de-blocking) and BL adaptive filtering 720 (e.g., SAO) in the BL. Adaptive up-sampling 2420 will generate the pixels at the interpolation positions associated with the EL. The filtered BL (or lower resolution layer) pixels and the interpolated pixels are used to predict the EL signal (or higher resolution layer) content. In FIG. 24, the filtered BL (or lower resolution layer) pixels are passed to the EL through adaptive up-sampling 2420. However, the filtered BL (or lower resolution layer) pixels may also be passed to the EL explicitly. As mentioned before that the EL can also be the same resolution as the BL, i.e. in the case of quality (i.e. SNR) scalability. For SNR scalability, the filtered BL pixels are processed by the inter-layer adaptive filtering and then used to predict the EL data. In this case, there is no up-sampling filtering required.

Figure 25:
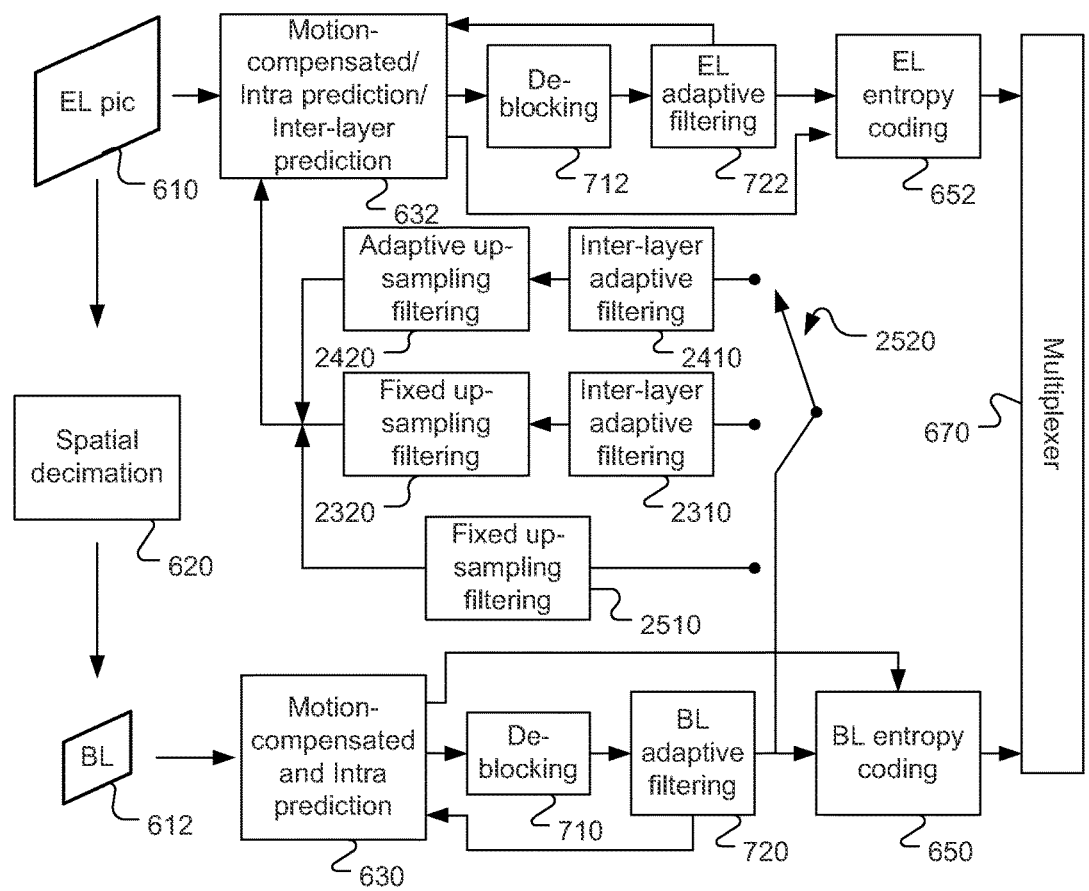
FIG. 25 illustrates a block diagram for an exemplary scalable two-layer video encoding system incorporating inter-layer filtering, where the inter-layer filtering is selected from multiple inter-layer filtering branches.

FIG. 25 illustrates another system configuration where inter-layer filtering comprises three selectable inter-layer adaptive filtering branches using switch 2520. The first inter-layer adaptive filtering branch corresponds to inter-layer adaptive filtering 2310 followed by fixed up-sampling 2320 as shown in FIG. 23. The second inter-layer adaptive filtering branch corresponds to inter-layer adaptive filtering 2410 followed by adaptive up-sampling 2420 as shown in FIG. 24. The third inter-layer adaptive filtering branch corresponds to fixed up-sampling filtering 2510 as in Scalable HEVC. One of the three inter-layer adaptive filtering branches is selected according to selection 2520 to generate the predictor for the EL pixels from the BL pixels. The selection can be made for each frame, each region within one frame, or each coding unit (for example, one Largest Coding Unit (LCU)).

Figure 26:
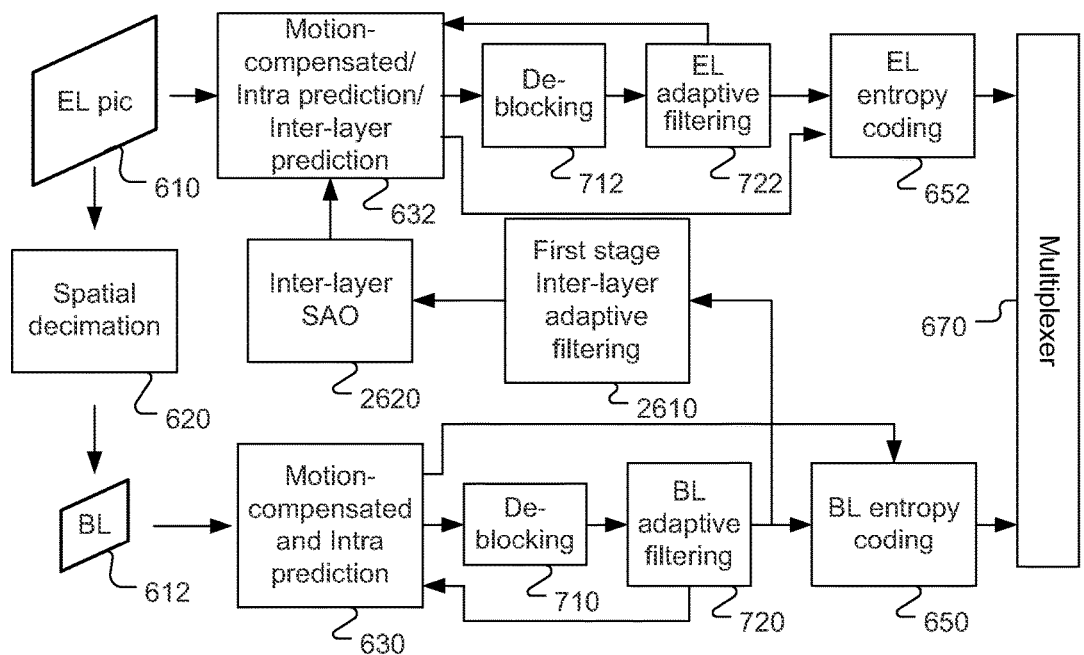
FIG. 26 illustrates a block diagram for an exemplary two-layer scalable video encoding system incorporating inter-layer filtering, where the inter-layer filtering comprises first stage inter-layer adaptive filtering followed by inter-layer SAO.

FIG. 26 illustrates another scalable video coding system incorporating inter-layer filtering according to an embodiment of the present invention. The inter-layer filtering is configured into two stages 2610 and 2620. First stage inter-layer adaptive filter 2610 may correspond to one of the three inter-layer adaptive filtering branches as shown in FIG. 25. For example, first stage inter-layer adaptive filter 2610 may correspond to the second branch, i.e., inter-layer adaptive filtering 2410 followed by adaptive up-sampling filtering 2420. The second stage may correspond to inter-layer SAO 2620. The reconstructed BL data is processed by de-blocking 710 and BL adaptive filtering 720 (e.g., SAO). The filtered BL pixels are then interpolated using first stage inter-layer adaptive filtering 2610 and inter-layer SAO 2620 before the filtered BL pixels are used to predict the EL video data.

Figure 27:
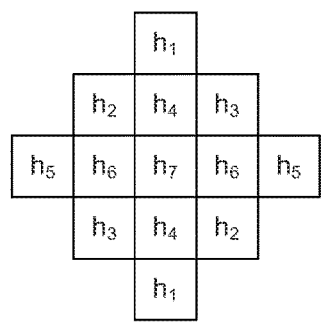
FIG. 27 illustrates a 5×5 diamond shaped filter for interpolation.

In the up-sampling process, some output pixels (i.e., up-sampled pixels) in the EL are collocated with the BL pixels and some output pixels are not. FIG. 12 illustrates an example for the case of 1:2 up-sampling and FIG. 13 illustrates an example for the case of 1:1.5 up-sampling. The pixels that are collocated with the reconstructed BL pixels are indicated by capital letters and the non-collocated interpolated pixels are indicated by lowercase letters. To filter the collocated pixels of the BL reconstructed pixels (i.e. the pixels denoted by capital letters in FIG. 12 and FIG. 13), a 5×5 diamond shaped filter as shown in FIG. 27 may be used. This filter is 2-D non-separable, represented by seven distinct filter coefficients, $\{h_i\}$ i=1, ..., 7. For 1.5× up-sampling, some BL reconstructed pixels do not correspond to collocated pixels in the EL. For example, pixel locations at D5, E4 and E5 in FIG. 13 do not correspond to collocated pixels in the EL. These pixels are processed by the adaptive filtering with the filter shape in FIG. 27, and then these pixels are used for up-sampling other pixels. For example, pixel "C3" is filtered according to equation (20).

$$E5 = (C5+G5)*h_1 + (D4+F6)*h_2 + (D6+F4)*h_3 + (D5+F5)*h_4 + (E3+E7)*h_5 + (E4+E6)*h_6 + E5*h_7 \quad (20)$$

To generate the pixels in the interpolated positions (i.e., the pixels denoted by lowercase letters in FIG. 12 and FIG. 13) with adaptive filtering, two 2-D non-separable filter shapes are used for the pixels at different interpolation positions. For 2× up-sampling in FIG. 12, the pixels at positions "a" and "b" are generated with the one filter shape while the pixels at position "c" are generated with another filter shape. For 1.5× up-sampling in FIG. 13, the pixels at positions "a", "b", "c" and "f" are produced with one filter shape while the pixels at positions "d", "e", "g" and "h" are produced with another filter shape.

In one embodiment for 2× up-sampling, as shown in FIG. 12, pixels at location corresponding to "a" are generated by applying the adaptive filter to BL pixels using 18 distinct filter coefficients, $\{k_i\}$, i=1, ..., 18, according to equation (21):

$$a = k_1*B4 + k_2*B5 + k_3*C6 + k_4*D7 + k_5*E6 + k_6*F5 + k_7*F4 + k_8*E3 + k_9*D2 + k_{10}*C3 + k_{11}*C4 + k_{12}*C5 + k_{13}*D6 + k_{14}*E5 + k_{15}*E4 + k_{16}*D3 + k_{17}*D4 + k_{18}*D5 \quad (21)$$

Similarly, pixels at location corresponding to "b" are generated by applying the adaptive filter to BL pixels according to equation (22):

$$b = k_1*D6 + k_2*E6 + k_3*F5 + k_4*G4 + k_5*F3 + k_6*E2 + k_7*D2 + k_8*C3 + k_9*B4 + k_{10}*C5 + k_{11}*D5 + k_{12}*E5 + k_{13}*F4 + k_{14}*E3 + k_{15}*D3 + k_{16}*C4 + k_{17}*D4 + k_{18}*E4 \quad (22)$$

Pixels at location corresponding to "c" are generated by applying an adaptive 2-D non-separable filter to BL pixels using 24 distinct filter coefficients $\{k_i\}$ i=1, ..., 24, according to equation (23):

$$c = k_1*B5 + k_2*C6 + k_3*D7 + k_4*E7 + k_5*F6 + k_6*G5 + k_7*G4 + k_8*F3 + k_9*E2 + k_{10}*D2 + k_{11}*C3 + k_{12}*B4 + k_{13}*C5 + k_{14}*D6 + k_{15}*E6 + k_{16}*F5 + k_{17}*F4 + k_{18}*E3 + k_{19}*D3 + k_{20}*C4 + k_{21}*D5 + k_{22}*E5 + k_{23}*E4 + k_{24}*D4 \quad (23)$$

In another embodiment for 2× up-sampling as shown in FIG. 12, pixels at locations corresponding to "a" and "b" are generated by applying an adaptive filter that is represented by 10 distinct filter coefficients, $\{k_i\}$, i=1, ..., 10. Pixels at location corresponding to "a" are generated by applying the adaptive filtering to BL pixels according to equation (24):

$$a = k_1*(C3+E3) + k_2*(C4+E4) + k_3*(C5+E5) + k_4*(C6+E6) + k_5*D2 + k_6*D7 + k_7*D3 + k_8*D6 + k_9*D4 + k_{10}*D5. \quad (24)$$

Pixels at location corresponding to "b" are generated by applying the adaptive filter to BL pixels according to equation (25):

$$b = k_1*(C3+C5) + k_2*(D3+D5) + k_3*(E3+E5) + k_4*(F3+F5) + k_5*B4 + k_6*G4 + k_7*C4 + k_8*F4 + k_9*D4 + k_{10}*E4. \quad (25)$$

In one embodiment for 1.5× up-sampling as shown in FIG. 13, pixels at locations corresponding to "a", "b", "c" and "f" are generated by applying an adaptive filter that is represented by 18 distinct filter coefficients, $\{k_i\}$, i=1, ..., 18. Pixels at location corresponding to "a" are generated by applying the adaptive filter on BL pixels according to equation (26):

$$a = k_1*B4 + k_2*B5 + k_3*C6 + k_4*D7 + k_5*E6 + k_6*F5 + k_7*F4 + k_8*E3 + k_9*D2 + k_{10}*C3 + k_{11}*C4 + k_{12}*C5 + k_{13}*D6 + k_{14}*E5 + k_{15}*E4 + k_{16}*D3 + k_{17}*D4 + k_{18}*D5. \quad (26)$$

Pixels at location corresponding to "b" are generated by applying the adaptive filter to BL pixels according to equation (27):

$$b = k_1*B6 + k_2*B5 + k_3*C4 + k_4*D3 + k_5*E4 + k_6*F5 + k_7*F6 + k_8*E7 + k_9*D8 + k_{10}*C7 + k_{11}*C6 + k_{12}*C5 + k_{13}*D4 + k_{14}*E5 + k_{15}*E6 + k_{16}*D7 + k_{17}*D6 + k_{18}*D5. \quad (27)$$

Pixels at location corresponding to "c" are generated by applying the adaptive filter to BL pixels according to equation (28):

$$c = k_1*D6 + k_2*E6 + k_3*F5 + k_4*G4 + k_5*F3 + k_6*E2 + k_7*D2 + k_8*C3 + k_9*B4 + k_{10}*C5 + k_{11}*D5 + k_{12}*E5 + k_{13}*F4 + k_{14}*E3 + k_{15}*D3 + k_{16}*C4 + k_{17}*D4 + k_{18}*E4. \quad (28)$$

Pixels at location corresponding to "f" are generated by applying the adaptive filter to BL pixels according to equation (29):

$$f = k_1*F6 + k_2*E6 + k_3*D5 + k_4*C4 + k_5*D3 + k_6*E2 + k_7*F2 + k_8*G3 + k_9*H4 + k_{10}*G5 + k_{11}*F5 + k_{12}*E5 + k_{13}*D4 + k_{14}*E3 + k_{15}*F3 + k_{16}*G4 + k_{17}*F4 + k_{18}*E4. \quad (29)$$

Pixels at locations corresponding to "d", "e", "g" and "h" in FIG. 13 are generated by applying an adaptive 2-D non-separable filter represented with 24 distinct filter coefficients, $\{k_i\}$, i=1, ..., 24 to BL pixels. Pixel at position "d" is generated by applying the adaptive 2-D non-separable filter to BL pixels according to equation (30):

$$d = k_1*G4 + k_2*F3 + k_3*E2 + k_4*D2 + k_5*C3 + k_6*B4 + k_7*B5 + k_8*C6 + k_9*D7 + k_{10}*E7 + k_{11}*F6 + k_{12}*G5 +$$

$$k_{13}*F4+k_{14}*E3+k_{15}*D3+k_{16}*C4+k_{17}*C5+$$
$$k_{18}*D6+k_{19}*E6+k_{20}*F5+k_{21}*E4+k_{22}*D4+$$
$$k_{23}*D5+k_{24}*E5. \quad (30)$$

Pixels at location corresponding to "e" are generated by applying the adaptive filter to BL pixels according to equation (31):

$$e=k_1*G6+k_2*F7+k_3*E8+k_4*D8+k_5*C7+k_6*B6+$$
$$k_7*B5+k_8*C4+k_9*D3+k_{10}*E3+k_{11}*F4+k_{12}*G5+$$
$$k_{13}*F6+k_{14}*E7+k_{15}*D7+k_{16}*C6+k_{17}*C5+$$
$$k_{18}*D4+k_{19}*E4+k_{20}*F5+k_{21}*E6+k_{22}*D6+$$
$$k_{23}*D5+k_{24}*E5. \quad (31)$$

Pixels at location corresponding to "g" are generated by applying the adaptive filter to BL pixels according to equation (32):

$$g=k_1*C4+k_2*D3+k_3*E2+k_4*F2+k_5*G3+k_6*H4+$$
$$k_7*H5+k_8*G6+k_9*F7+k_{10}*E7+k_{11}*D6+k_{12}*C5+$$
$$k_{13}*D4+k_{14}*E3+k_{15}*F3+k_{16}*G4+k_{17}*G5+$$
$$k_{18}*F6+k_{19}*E6+k_{20}*D5+k_{21}*E4+k_{22}*F4+$$
$$k_{23}*F5+k_{24}*E5. \quad (32)$$

Pixels at location corresponding to "h" are generated by applying the adaptive filter to BL pixels according to equation (33):

$$h=k_1*C6+k_2*D7+k_3*E8+k_4*F8+k_5*G7+k_6*H6+$$
$$k_7*H5+k_8*G4+k_9*F3+k_{10}*E3+k_{11}*D4+k_{12}*C5+$$
$$k_{13}*D6+k_{14}*E7+k15*F7+k_{16}*G6+k_{17}*G5+$$
$$k_{18}*F4+k_{19}*E4+k_{20}*D5+k_{21}*E6+k_{22}*F6+$$
$$k_{23}*F5+k_{24}*E5. \quad (33)$$

The filter coefficients (i.e., $h_i$ in equation (20)) for the inter-layer adaptive filter can be determined based on the EL original pixels and the values of BL reconstructed pixels (denoted by capital letters in FIG. 12 and FIG. 13). There are well known method in the art to determine the coefficients that can minimize the error between the EL original pixels and the BL reconstructed pixels. For example, the Wiener filter solution and the least square filter solution are often used techniques to minimize the least square error between an original signal and a processed signal.

The filter coefficients (i.e., $k_i$ in equations (21)-(33)) for the inter-layer adaptive filter can be determined based on the EL original pixels and the values of neighboring pixels in BL collocated positions (denoted by capital letters in FIG. 12 and FIG. 13). There are well known method in the art to determine the coefficients that can minimize the error between the EL original pixels and the values of neighboring pixels in BL collocated positions, such as the Wiener filter solution, the least square filter solution, etc. The neighboring pixels in BL collocated positions can be the BL reconstruction pixels or the filtered pixels processed by the adaptive filtering of the BL reconstruction pixels.

The adaptive filtering methods can be applied according to classification at a picture level, where one set of filter coefficients is used for inter-layer filtering of the BL (or low resolution layer) pixels in one BL picture. The set of coefficients is derived from all pixels in one BL picture. Each color component (i.e., Y, Cb, or Cr) may use an individual set of filter coefficients. Chrominance components (i.e., Cb and Cr) may share the same filter coefficients for the same type of filter. For generating the interpolated pixels (denoted by lowercase letters in FIG. 12 and FIG. 13) by adaptive filtering, two sets of filter coefficients are derived and applied according to the interpolation position for one picture. For example, in the case of 2× up-sampling, one set is used for generating pixels corresponding to locations "a" and "b" in FIG. 12 and the other set for generating pixels corresponding to location "c" in FIG. 12. In the case of 1.5× up-sampling, one set of filter coefficients is used for generating pixels corresponding to positions "a", "b", "c" and "f" while the other set for the generating pixels corresponding to positions "d", "e", "g", and "h". Each color component (i.e., Y, Cb, or Cr) may have an individual set of interpolation filter coefficients. Chrominance components (i.e., Cb and Cr) may share the interpolation filter coefficients for the same type of filter.

In another embodiment, the BL reconstruction pixels are classified into categories. For each category, one set of filter coefficients is derived and applied to the pixels in the category. In another embodiment, the BL picture is divided into 4×4 blocks. The partition will result in blocks, P(x,y) with x=0, . . . , 3 and y=0, . . . , 3. Then, two values, $H_B$ and $V_B$ are calculated along the horizontal and vertical directions for each block as shown in equations (34) and (35):

$$HB=\Sigma_{x=1,2}\Sigma_{y=1,2}|P(x,y)<<1-P(x+1,y)-P(x-1,y)|, \quad (34)$$

$$VB=\Sigma_{x=1,2}\Sigma_{y=1,2}|P(x,y)<<1-P(x,y+1)-P(x,y-1)|. \quad (35)$$

The class index for each block is selected from Table 2 according to dir and avgVar, where dir and avgVar are calculated according to equations (36) and (37):

$$dir = \begin{cases} 1, & \text{if } VB > 2 \times H_B \\ 2, & \text{if } HB > 2 \times V_B \\ 0, & \text{otherwise} \end{cases} \quad (36)$$

$$avgVar=Quantization(H_B+V_B). \quad (37)$$

TABLE 2

| | avgVar | | | | | | | |
|---|---|---|---|---|---|---|---|---|
| dir | 0 | 1 | 2 | 3 | 4 | 5 | 6 | 7 |
| 0 | 0 | 1 | 2 | 2 | 3 | 3 | 3 | 4 |
| 1 | 0 | 6 | 7 | 7 | 8 | 8 | 8 | 9 |
| 2 | 0 | 11 | 12 | 12 | 13 | 13 | 13 | 14 |

| | avgVar | | | | | | | |
|---|---|---|---|---|---|---|---|---|
| dir | 8 | 9 | 10 | 11 | 12 | 13 | 14 | 15 |
| 0 | 4 | 4 | 4 | 5 | 5 | 5 | 5 | 5 |
| 1 | 9 | 9 | 9 | 10 | 10 | 10 | 10 | 10 |
| 2 | 14 | 14 | 14 | 15 | 15 | 15 | 15 | 15 |

In the above embodiment, some categories with similar statistics can share the same set of filter coefficients. Therefore, there are at most 16 categories.

For the interpolated pixels (denoted by lowercase letters in FIG. 12 and FIG. 13), the pixels at interpolation positions can be classified into categories. One set of filter coefficients is derived and applied to the pixels in the category. In the case of 2× up-sampling, all pixels at location corresponding to "a" and "b" use the same sets of filter coefficients. While pixels at the location corresponding to "c" also use some other sets of filter coefficients. In one embodiment, for pixels at location corresponding to "a", $H_B$ and $V_B$ are calculated according to equations (38) and (39):

$$H_B=(D4<<1-D3-D5)+(D5<<1-D4-D6)+(E4<<1-E3-E5)+(E5<<1-E4-E6), \quad (38)$$

$$V_B=(D3<<1-C3-E3)+(D4<<1-C4-E4)+(D5<<1-C5-E5)+(D6<<1-C6-E6). \quad (39)$$

For pixels at location corresponding to "b", $H_B$ and $V_B$ are calculated according to equation (40) and (41):

$$H_B=(D4<<1-C4-E4)+(E4<<1-D4-F4)+(D5<<1-C5-E5)+(E5<<1-D5-F5), \quad (40)$$

$$V_B=(C4<<1-C3-C5)+(D4<<1-D3-D5)+(E4<<1-E3-E5)+(F4<<1-F3-F5). \quad (41)$$

After $H_B$ and $V_B$ are derived, dir and avgVar are calculated according to equation (36) and (37) and the class index for each pixel is selected using Table 2. For pixels at location corresponding to "c", HB and VB are calculated according to equation (42) and (43):

$$H_B=(D4<<1-D3-D5)+(D5<<1-D4-D6)+(E4<<1-E3-E5)+(E5<<1-E4-E6), \quad (42)$$

$$V_B=(D4<<1-C4-E4)+(D5<<1-C5-E5)+(E4<<1-D4-F4)+(E5<<1-D5-F5). \quad (43)$$

After $H_B$ and $V_B$ are derived, dir and avgVar are calculated according to equations (36) and (37) and the class index for each pixel is selected using Table 2.

In another embodiment, for pixels at locations corresponding to "a", $H_B$ and $V_B$ are calculated according to equations (38) and (44):

$$V_B=(D4<<1-C4-E4)+(D5<<1-C5-E5)+(E4<<1-D4-F4))+(E5<<1-D5-F5). \quad (44)$$

For pixels at location corresponding to "b", $H_B$ and $V_B$ are calculated according to equations (40) and (45):

$$V_B=(D4<<1-D3-D5)+(D5<<1-D4-D6)+(E4<<1-E3-E5)+(E5<<1-E4-E6) \quad (45)$$

After HB and HV are derived according to equations (42) and (43), dir and avgVar are calculated according to equations (36) and (37) and the class index for each pixel is selected using Table 2.

In the case of 1.5× up-sampling, all pixels at positions corresponding to "a", "b", "c" and "f" use same sets of filter coefficients. Similarly, the pixels at positions corresponding to "d", "e", "g" and "h" use some other sets of filter coefficients. In one embodiment, for pixels at location "a", $H_B$ and $V_B$ are calculated according to equations (46) and (47):

$$H_B=(D4<<1-D3-D5)+(D5<<1-D4-D6)+(E4<<1-E3-E5)+(E5<<1-E4-E6), \quad (46)$$

$$V_B=(D3<<1-C3-E3)+(D4<<1-C4-E4)+(D5<<1-C5-E5)+(D6<<1-C6-E6). \quad (47)$$

For pixels at location corresponding to "b", $H_B$ and $V_B$ are calculated according to equations (48) and (49):

$$H_B=(D5<<1-D4-D6)+(D6<<1-D5-D7)+(E5<<1-E4-E6)+(E6<<1-E5-E7), \quad (48)$$

$$V_B=(D4<<1-C4-E4)+(D5<<1-C5-E5)+(D6<<1-C6-E6)+(D7<<1-C7-E7). \quad (49)$$

For pixels at location corresponding to "c", $H_B$ and $V_B$ are calculated according to equations (50) and (51):

$$H_B=(D4<<1-C4-E4)+(E4<<1-D4-F4)+(D5<<1-C5-E5)+(E5<<1-D5-F5), \quad (50)$$

$$V_B=(C4<<1-C3-C5)+(D4<<1-D3-D5)+(E4<<1-E3-E5)+(F4<<1-F3-F5). \quad (51)$$

For pixels at location corresponding to "f", $H_B$ and $V_B$ are calculated according to equations (52) and (53):

$$H_B=(E4<<1-D4-F4)+(F4<<1-E4-G4)+(E5<<1-D5-F5)+(F5<<1-E5-G5), \quad (52)$$

$$V_B=(D4<<1-D3-D5)+(E4<<1-E3-E5)+(F4<<1-F3-F5)+(G4<<1-G3-G5). \quad (53)$$

For pixels at location corresponding to "d", $H_B$ and $V_B$ are calculated according to equations (54) and (55):

$$H_B=(D4<<1-D3-D5)+(D5<<1-D4-D6)+(E4<<1-E3-E5)+(E5<<1-E4-E6), \quad (54)$$

$$V_B=(D4<<1-C4-E4)+(D5<<1-C5-E5)+(E4<<1-D4-F4)+(E5<<1-D5-F5). \quad (55)$$

For pixels at location corresponding to "e", $H_B$ and $V_B$ are calculated according to equations (56) and (57):

$$H_B=(D5<<1-D4-D6)+(D6<<1-D5-D7)+(E5<<1-E4-E6)+(E6<<1-E5-E7), \quad (56)$$

$$V_B=(D5<<1-C5-E5)+(D6<<1-C6-E6)+(E5<<1-D5-F5)+(E6<<1-D6-F6). \quad (57)$$

For pixels at location corresponding to "g", $H_B$ and $V_B$ are calculated according to equations (58) and (59):

$$H_B=(E4<<1-E3-E5)+(E5<<1-E4-E6)+(F4<<1-F3-F5)+(F5<<1-F4-F6), \quad (58)$$

$$V_B=(E4<<1-D4-F4)+(E5<<1-D5-F5)+(F4<<1-E4-G4)+(F5<<1-E5-G5). \quad (59)$$

For pixels at location corresponding to "h", $H_B$ and $V_B$ are calculated according to equations (60) and (61):

$$H_B=(E5<<1-E4-E6)+(E6<<1-E5-E7)+(F5<<1-F4-F6)+(F6<<1-F5-F7). \quad (60)$$

$$V_B=(E5<<1-D5-F5)+(E6<<1-D6-F6)+(F5<<1-E5-G5)+(F6<<1-E6-G6). \quad (61)$$

After $H_B$ and $V_B$ are derived according to equations (42) and (43), dir and avgVar are calculated according to equations (36) and (37) and the class index for each pixel is selected using Table 2.

In yet another embodiment, for pixels at location corresponding to "a", $H_B$ and $V_B$ are calculated according to equations (46) and (62):

$$V_B=(D4<<1-C4-E4)+(D5<<1-C5-E5)+(E4<<1-D4-F4))+(E5<<1-D5-F5). \quad (62)$$

For pixels at location corresponding to "b", $H_B$ and $V_B$ are calculated according to equations (48) and (63):

$$V_B=(D5<<1-C5-E5)+(D6<<1-C6-E6)+(E5<<1-D5-F5)+(E6<<1-D6-F6). \quad (63)$$

For pixels at location corresponding to "c", $H_B$ and $V_B$ are calculated according to equations (50) and (64):

$$V_B=(D4<<1-D3-D5)+(E4<<1-E3-E5)+(D5<<1-D4-D6)+(E5<<1-E4-E6). \quad (64)$$

For pixels at positions corresponding to "f", $H_B$ and $V_B$ are calculated according to equations (52) and (65):

$$V_B=(E4<<1-E3-E5)+(E5<<1-E4-E6)+(F4<<1-F3-F5)+(F5<<1-F4-F6). \quad (65)$$

After $H_B$ and $V_B$ are derived according to equations (42) and (43), dir and avgVar are calculated according to equations (36) and (37) and the class index for each pixel is selected using Table 2.

Inter-layer adaptive filtering can be applied with local adaptivity. In one embodiment, the inter-layer adaptive filtering is applied at region (or sub-picture) level, i.e. one set of filter coefficients are applied to all pixels in one picture region. For region-based inter-layer adaptive filtering, the filter coefficients are derived based on all pixels in the region. The region can be an LCU, a set of LCUs, a slice or a group of slices, a tile or a group of tiles, etc.

In another embodiment, the decision on whether to use the inter-layer filtering is made for each region. One flag is transmitted to signal whether the inter-layer filtering is applied to the region. The region can be a LCU, a set of LCUs, a slice or a group of slices, a tile or a group of tiles, a color component of one frame, one frame, etc. The inter-layer filtering may correspond to one of the inter-layer filtering branches as shown in FIG. 25. For example, the inter-layer filtering may corresponds to inter-layer adaptive filtering 2410 followed by adaptive up-sampling filtering 2420. A flag can used to indicate whether this inter-layer filtering is applied to a region. The region-based inter-layer filtering may also correspond to the inter-layer adaptive filtering 2310 followed by fixed up-sampling filtering 2320 as shown in FIG. 25. Furthermore, the region-based inter-layer filtering may only include fixed up-sampling filtering 2510 as shown in FIG. 25.

When the adaptive inter-layer filtering is used, the filter coefficients may have to be transmitted. To transmit the filter coefficients will consume the available coding bandwidth. It is desirable to transmit the filter coefficients in a compressed form. In one embodiment, the filter coefficients are coded using universal variable length codes. In another embodiment, the filter coefficients are coded with exponential Golomb codes. The order of the exponential Golomb code used for coding the filter coefficients, i.e., $\{h_i\}$ i=1, ..., 7, is given in Table 3.

TABLE 3

| h1 | h2 | h3 | h4 | h5 | h6 | h7 |
|---|---|---|---|---|---|---|
| 2 | 3 | 3 | 4 | 3 | 5 | 0 |

In another embodiment, when the interpolated pixels at positions "a" and "b" are generated according to equations (21) and (22) for 2× up-sampling, the order of the exponential Golomb code used for coding the filter coefficients, i.e., $\{k_i\}$ i=1, ..., 18, is given in Table 4.

TABLE 4

| k1 | k2 | k3 | k4 | k5 | k6 | k7 | k8 | k9 |
|---|---|---|---|---|---|---|---|---|
| 2 | 2 | 2 | 2 | 2 | 2 | 2 | 2 | 2 |
| k10 | k11 | k12 | k13 | k14 | k15 | k16 | k17 | k18 |
| 2 | 3 | 3 | 3 | 3 | 3 | 3 | 4 | 0 |

In yet another embodiment, when the interpolated pixels at locations corresponding to "a" and "b" are generated according to equations (24) and (25) for 2× up-sampling, the order of the exponential Golomb code used for coding the filter coefficients, i.e., $\{k_i\}$ i=1, ..., 10, is given in Table 5.

TABLE 5

| k1 | k2 | k3 | k4 | k5 | k6 | k7 | k8 | k9 | k10 |
|---|---|---|---|---|---|---|---|---|---|
| 2 | 3 | 3 | 2 | 2 | 2 | 3 | 3 | 4 | 0 |

In another embodiment, when the interpolated pixels at location corresponding to "c" are generated according to equation (23) for 2× up-sampling, the order of the exponential Golomb code used for coding the filter coefficients, i.e., $\{k_i\}$ i=1, ..., 24, is given in Table 6.

TABLE 6

| k1 | k2 | k3 | k4 | k5 | k6 | k7 | k8 | k9 | k10 | k11 | k12 |
|---|---|---|---|---|---|---|---|---|---|---|---|
| 2 | 2 | 2 | 2 | 2 | 2 | 2 | 2 | 2 | 2 | 2 | 2 |
| k13 | k14 | k15 | k16 | k17 | k18 | k19 | k20 | k21 | k22 | k23 | k24 |
| 3 | 3 | 3 | 3 | 3 | 3 | 3 | 3 | 4 | 4 | 4 | 0 |

In another embodiment, when the interpolated pixels at positions "a" "b" "c" and "f" are generated according to equations (26), (27), (28) and (29) for 1.5× up-sampling, the order of the exponential Golomb code used for coding the filter coefficients, i.e., $\{k_i\}$ i=1, ..., 18, is given in Table 7.

TABLE 7

| k1 | k2 | k3 | k4 | k5 | k6 | k7 | k8 | k9 |
|---|---|---|---|---|---|---|---|---|
| 2 | 2 | 2 | 2 | 2 | 2 | 2 | 2 | 2 |
| k10 | k11 | k12 | k13 | k14 | k15 | k16 | k17 | k18 |
| 2 | 3 | 3 | 3 | 3 | 3 | 3 | 4 | 0 |

In another embodiment, when the interpolated pixels at locations corresponding to "d" "e" "g" and "h" are generated according to equations (30), (31), (32), (33) for 1.5× up-sampling, the order of the exponential Golomb code used for coding the filter coefficients, i.e., $\{k_i\}$ i=1, ..., 24, is given in Table 8.

TABLE 8

| k1 | k2 | k3 | k4 | k5 | k6 | k7 | k8 | k9 | k10 | k11 | k12 |
|---|---|---|---|---|---|---|---|---|---|---|---|
| 2 | 2 | 2 | 2 | 2 | 2 | 2 | 2 | 2 | 2 | 2 | 2 |
| k13 | k14 | k15 | k16 | k17 | k18 | k19 | k20 | k21 | k22 | k23 | k24 |
| 3 | 3 | 3 | 3 | 3 | 3 | 3 | 3 | 4 | 4 | 4 | 0 |

In the case of classification based inter-layer filtering, the BL picture may divided into 4×4 blocks as mentioned before. The partition will result in 16 categories and each block may belong to one category and use its own set of filter coefficients. However, there are 16 categories at most since some categories may use the same set of filter coefficients. In one embodiment, the number of distinct sets of filter coefficients is transmitted. In addition, a 1-bit flag is transmitted for each category to indicate whether the current category share the filter coefficients with the previous category.

In the region based adaptive filtering method, the flags indicating whether the adaptive filtering is applied to each region in one picture are transmitted together in picture parameter set (PPS) or slice header. When one region corresponds to one LCU, the flag indicating whether the adaptive filtering is applied to the LCU is transmitted in the LCU syntax.

Figure 28:
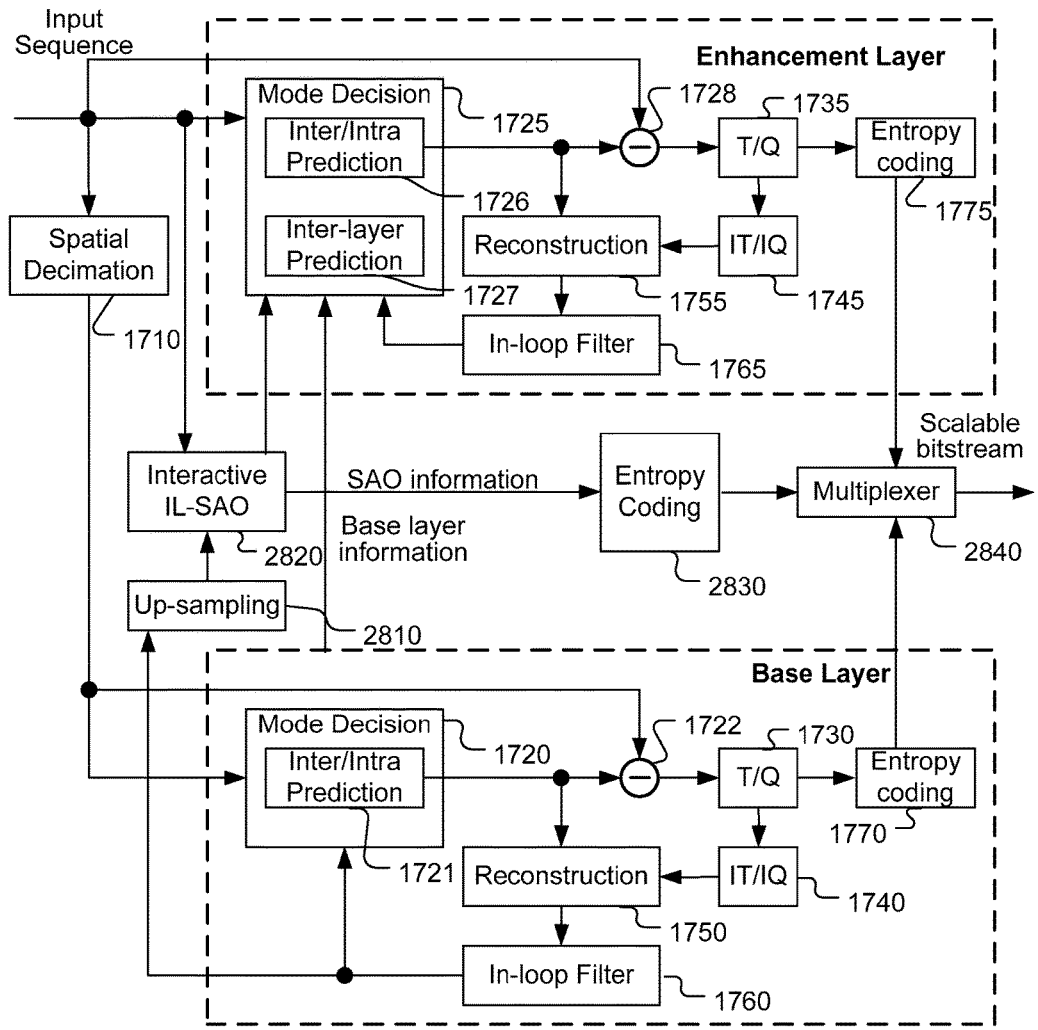
FIG. 28 illustrates a block diagram for an exemplary two-layer scalable video encoding system incorporating inter-layer filtering, where the inter-layer filtering comprises up-sampling followed by interactive inter-layer SAO.

In another embodiment, the inter-layer adaptive filtering, such as inter-layer SAO (IL-SAO) can be applied in an iterative fashion. The iterative inter-layer sample adaptive offset (IT-IL-SAO) is applied to up-sampled base layer data in scalable video coding. Inter-layer SAO can reduce artifacts in the up-sampled base layer data and provide better prediction between layers. The reconstructed BL samples are up-sampled to generate the predictor for collocated EL samples, as shown in FIG. 28. The system is similar to the system in FIG. 17. However, up-sampling 2810 and iterative IL-SAO 2820 are used to replace interpolation 1712 of FIG. 17. In HEVC based scalable extension, when a coding unit (CU) in the EL is coded as inter-layer texture prediction, the corresponding texture in the BL is up-sampled and used as texture predictors for the CU in the EL. The up-sampling will interpolate the reconstructed BL samples to match the EL spatial resolution. The iterative inter-layer sample adaptive offset (IT-IL-SAO) is to calculate the offset by using the HEVC SAO method iteratively and use the enhancement layer picture as the reference for the processed up-sampled reconstructed base layer picture in a previous iteration.

In the HEVC standard, SAO process can use edge offset (EO), band offset (BO) or no SAO (i.e., OFF). In one embodiment, a signaling flag is used to indicate the number of iterations of inter-layer SAO. For example, the signaling flag can be "inter_layer_sample_adaptive_offset_iteration_number". The corresponding sets of offset can be transmitted in the slice header. In one embodiment, the number of iterations is chosen to be 3. A first-round of IL-SAO is applied to the up-sampled base layer picture and the SAO parameters are determined based on the up-sampled reconstructed base layer picture and the original enhancement layer picture. Then the second-round of IL-SAO is applied to the IL-SAO filtered picture, where the SAO parameters are determined based on the IL-SAO filtered picture and the original enhancement layer picture. The third-round of IL-SAO is then applied to the picture obtained from the second-round IL-SAO, where the SAO parameters are determined based on the picture obtained from the second-round of IL-SAO and the original enhancement layer picture. Three sets of IL-SAO parameters are sent in the slice header. An exemplary syntax for carrying three sets of IL-SAO parameters are shown as follows:

In one example embodiment, the signal flag is defined in sequence parameter set (SPS) so that each picture in the sequence will share the same number of iterations of IL-SAO as shown below.

| seq_parameter_set_rbsp( ){ | Descriptor |
|---|---|
| ... ... | |
| inter_layer_sample_adaptive_offset_iteration_number | ue(v) |
| ... ... | |
| } | |

In another embodiment, the signaling flags are defined as follows:

"inter_layer_sample_adaptive_offset_iteration_number" defines the number of iteration and the flag can be in picture parameter set (PPS) so that different picture can use different number of iterations of IL-SAO.

"inter_layer_sample_adaptive_offset_iteration_enable_flag" is a flag in the SPS level to indicate whether IT-TL-SAO is enabled for the sequence.

Exemplary syntax designs incorporating the above flags are show as follows.

| seq_parameter_set_rbsp( ){ | Descriptor |
|---|---|
| ... ... | |
| inter_layer_sample_adaptive_offset_iteration_enable_flag | u(1) |
| ... ... | |
| } | |

| pic_parameter_set_rbsp( ){ | Descriptor |
|---|---|
| ... ... | |
| if (inter_layer_sample_adaptive_offset_iteration_enable_flag) { | |
| inter_layer_sample_adaptive_offset_iteration_number | ue(v) |
| } | |
| ... ... | |
| } | |

In another embodiment, syntax elements are also used to remove BO in IT-IL-SAO when the number of iteration exceeds a threshold. Exemplary syntax elements are shown below to illustrate an example of removing BO when the number exceeds a threshold.

"inter_layer_sample_adaptive_offset_iteration_idx" corresponds to the index of the iteration. If the index is greater than or equal to a threshold N (e.g., N=2), BO will be disabled after the second round of iteration.

Furthermore, a BO depth flag, "inter_layer_sample_adaptive_offset_bo_depth" can be signaled in either SPS or PPS, depending on the location of the iteration number flag, "inter_layer_sample_adaptive_offset_iteration_number". For example, if the iteration number flag is in SPS, the BO depth flag is also defined in SPS. When BO is disabled, the number of IL_SAO types in the iteration becomes 5, i.e., 4 EO types corresponding to 0°, 45°, 90° and 135°, and OFF.

| SAO_TYPE[0] | SAO_PARAM[0] | SAO_TYPE[1] | SAO_PARAM[1] | SAO_TYPE[2] | SAO_PARAM[2] | ... |

If the BO depth flag is 0, BO will not be removed in any iteration. The BO depth can in incorporated in the SPS level as shown below.

| seq_parameter_set_rbsp( ){ | Descriptor |
|---|---|
| ... ... | |
| inter_layer_sample_adaptive_offset_bo_depth | ue(v) |
| ... ... | |
| } | |

In another embodiment, one or more SAO types can be removed in IT-IL-SAO when the number of iterations reaches a threshold. For example, both 0° and 90° EO types can be disabled after a selected number of iterations (e.g., 2 iterations). An iteration threshold flag can be used for each of EO types to indicate whether the selected EO type is removed when the iteration threshold is reached. For example, inter_layer_sample_adaptive_offset_depth[i] can be used to indicate the iteration threshold for EO type, where for i equals to 1 for 0° EO and i equals to 2 for 900 EO. The iteration threshold flag is incorporated in either SPS or PPS, depending on the location of iteration SAO control flag, "inter_layer_sample_adaptive_offset_iteration_number" can be used. If the control flag is in SPS, the iteration threshold flag is also incorporated in SPS. In the example that the iteration threshold flags for both 0° EO and 90° EO are set to 2, neither 0° EO nor 90° EO will be used during the second iteration and beyond. Accordingly, the number of IL_SAO types in the second iteration becomes 4, i.e., 45° EO, 135° EO, BO, and OFF, and only 4 type indexes need to be coded. If the iteration threshold is 0, the corresponding SAO type will not be removed in any iteration. An example of syntax design to incorporate the iteration threshold for individual SAO type in SPS is shown below.

| seq_parameter_set_rbsp( ){ | Descriptor |
|---|---|
| ... ... | |
| for( i = 1; | |
| i < TOTAL_NUMBER_OF_IL_SAO_TYPE-1; i++ ){ | |
| inter_layer_sample_adaptive_offset_depth[i] | ue(v) |
| } | |
| ... ... | |
| } | |

In another embodiment, an SAO type order flag is used to indicate the order of SAO types. For example, "inter_layer_sample_adaptive_offset_reordering_enable_flag" can be used as the SAO type order flag. In one example, the SAO type order of the HEVC standard is used, where the type order indexes 0 to 5 correspond to 45° EO, 135° EO, 0° EO, 90° EO, OFF and BO respectively. If the SAO type order flag is false (i.e., a value of 0), the default order will be used. Otherwise, the non-default SAO type order will be signaled. The corresponding sets of offset values for each SAO type can be sent in the slice header. For each SAO type, an On/Off flag can be used to indicate whether the SAO type is used.

In another embodiment, the SAO type order flag is signaled in the sequence parameter set (SPS) as shown below so that all pictures in the sequence will share the same order of IL-SAO types.

| seq_parameter_set_rbsp( ){ | Descriptor |
|---|---|
| ... ... | |
| inter_layer_sample_adaptive_offset_reordering_flag | u(1) |
| if | |
| (inter_layer_sample_adaptive_offset_reordering_enable_flag) | |
| { | |
| inter_layer_sample_adaptive_offset_order | ue(v) |
| } | |
| ... ... | |
| } | |

In another embodiment, the SAO type order flag is incorporated in picture parameter set (PPS) so each picture can use an individual IL-SAO type. An SAO enable flag, "inter_layer_sample_adaptive_offset_iteration_enable_flag" is incorporated in SPS. An iteration number flag, "inter_layer sample_adaptive_offset_iteration_number" is incorporated in PPS to determine the iteration threshold regarding when to stop using the SAO. Examples of SPS and PPS syntax design to incorporate the respective SAO type order flag and iteration threshold are shown below.

| seq_parameter_set_rbsp( ){ | Descriptor |
|---|---|
| ... ... | |
| inter_layer_sample_adaptive_offset_reordering_enable_flag | u(1) |
| ... ... | |
| } | |

| pic_parameter_set_rbsp( ){ | Descriptor |
|---|---|
| ... ... | |
| if | |
| (inter_layer_sample_adaptive_offset_reordering_enable_flag) | |
| { | |
| inter_layer_sample_adaptive_offset_order | ue(v) |
| } | |
| ... ... | |
| } | |

In another embodiment, the IL-SAO type index (i.e., il_sao_type_idx_luma or il_sao_type_idx_chroma) are incorporated in the bitstream, where SAO type indexes can be the same as the SAO type indexes of the HEVC standard, i.e., the type order indexes 0 to 5 corresponding to 45° EO, 135° EO, 0° EO, 90° EO, OFF and BO respectively. In another embodiment, the SAO type index is incorporated in the SPS, where an inter-layer SAO type index enable flag, "inter layer_sample_adaptive_offset_type_idx_enable_flag" is used to indicate whether non-default inter-layer SAO type index is allowed for the sequence. If the flag is enabled, inter-layer SAO index, "inter_layer_sample_adaptive_offset_idx[i]" for each SAO type is incorporated in the SPS as shown below.

| seq_parameter_set_rbsp( ){ | Descriptor |
|---|---|
| ... ... | |
| inter_layer_sample_adaptive_offset_type_idx_enable_flag | u(1) |
| if | |
| (inter_layer_sample_adaptive_offset_iteration_enable_flag) { | |

```
                                                              De-
                                                              scrip-
seq_parameter_set_rbsp( ){                                    tor for( i = 0; i < NUMBER_OF_IL_SAO_TYPE; i++ ){
        inter_layer_sample_adaptive_offset_idx[i]             u(v)
    }
}
... ...
}
```

Figure 29:
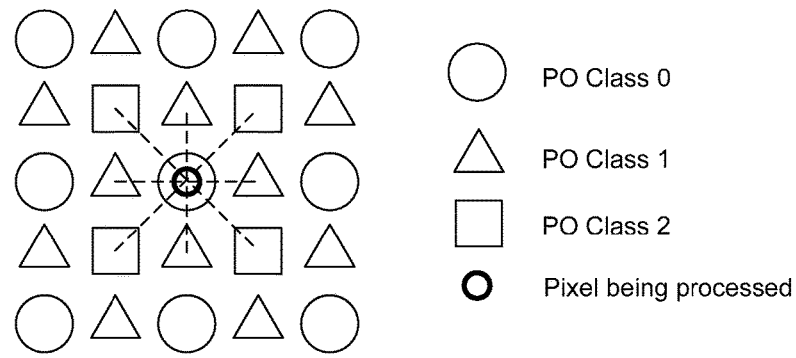
FIG. 29 illustrates an example of phase offset classification based on phase information for 2× up-sampling, where the pixels are classified into three classes.

In another embodiment, the pixel phase is used in up-sampling for classification to extend the inter-layer sample-adaptive offset (IL-SAO) to inter-layer phase-adaptive offset (IL-PAO). For example, 3 phase offset (PO) classes are shown as follows:

If PhaseX=0 and PhaseY=0, Phase Offset (PO) Class=0;
If PhaseX=0 and PhaseY !=0, Phase Offset (PO) Class=1;
If PhaseX !=0 and PhaseY=0, Phase Offset (PO) Class=1;
If PhaseX !=0 and PhaseY !=0, Phase Offset (PO) Class=2, where PhaseX and PhaseY indicate the phase of the pixel (x, y) in x-coordinate and y-coordinate, respectively. FIG. 29 illustrates an example of 2× up-sampling, where the pixels are classified into 3 PO classes based on their up-sampling phase position. PO class 0 corresponds to zero-phase pixels, i.e., the EL pixel locations collocated with the reconstructed BL pixels. PO class 1 corresponds to pixels between two horizontal PO class 0 pixels or two vertical PO class 0 pixels. PO class 2 corresponds to pixels in the center of neighboring 2×2 PO class 0 pixels. The classification based on phase offset is similar to the classification by location types (e.g. "a", "b" and "c" in FIG. 12). However, the concept of phase is introduced in FIG. 29.

In another embodiment, syntax design to support IL-PAO is disclosed. The number of iterations, "inter_layer_phase_adaptive_offset_iteration_number[i]" can be defined for each IL-PAO. The corresponding sets of offset can be sent in a slice header. For example, the number of iterations of PO Class 0 can be set to 1 and the number of iterations for both PO Class 1 and PO Class 2 are set to 2. A first-round IL-PAO will be applied to PO Class 0, 1 and 2 pixels of the up-sampled BL video data, where the PAO filter is designed to minimize the difference between the up-sampled reconstructed base layer picture and the original enhancement layer picture. The second-round IL-PAO is then performed only on PO Class 1 and 2, where the PAO filter is designed to minimize the difference between the IL-PAO filtered picture and the original enhancement layer picture.

In another embodiment, a signal flag can be incorporated in sequence parameter set (SPS) so all pictures in the sequence share the same number of iterations of IL-PAO for the PO classes as shown below.

```
seq_parameter_set_rbsp( ){                                    Descriptor
... ...
    for( i = 0; i < NUMBER_OF_PO_CLASS; i++ ){
        inter_layer_sample_adaptive_offset_iteration_number   u(v)
    }
... ...
}
```

In another embodiment, an inter-layer PAO iteration number flag, "inter_layer_phase_adaptive_offset_iteration_number[i]" for each IL-PAO is incorporated in picture parameter set (PPS) so that each picture can use an individual number of iterations of IL-PAO for each PO class. The individual picture IL-PAO can be controlled using an inter-layer PAO enable flag, "inter_layer_phase_adaptive_offset_iteration_enable_flag" in SPS. When the inter-layer PAO enable flag indicates the inter-layer PAO is enabled for the sequence, the inter-layer PAO iteration number flag will be incorporated in PPS as shown below.

```
seq_parameter_set_rbsp( ){                                    Descriptor
... ...
inter_layer_sample_adaptive_offset_iteration_enable_flag      u(1)
... ...
}
```

```
                                                              De-
                                                              scrip-
pic_parameter_set_rbsp( ){                                    tor
... ...
if (inter_layer_phase_adaptive_offset_iteration_enable_flag) {
    for( i = 0; i < NUMBER_OF_PO_CLASS; i++ ){
        inter_layer_phase_adaptive_offset_iteration_number[i]  u(v)
    }
}
... ...
}
```

Figure 30:
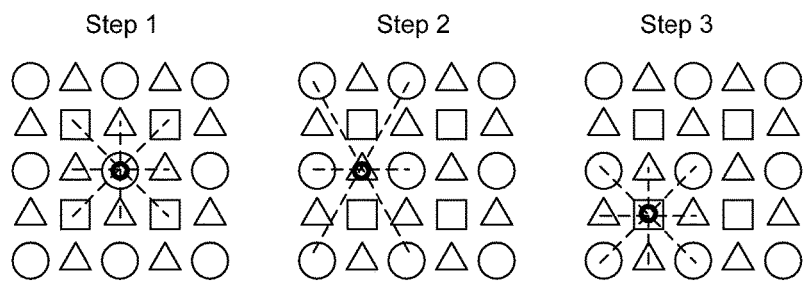
FIG. 30 illustrates an example of pyramid inter-layer phase adaptive offset (IL-PAO) with three levels and three steps for 2× up-sampling.
Figure 31:
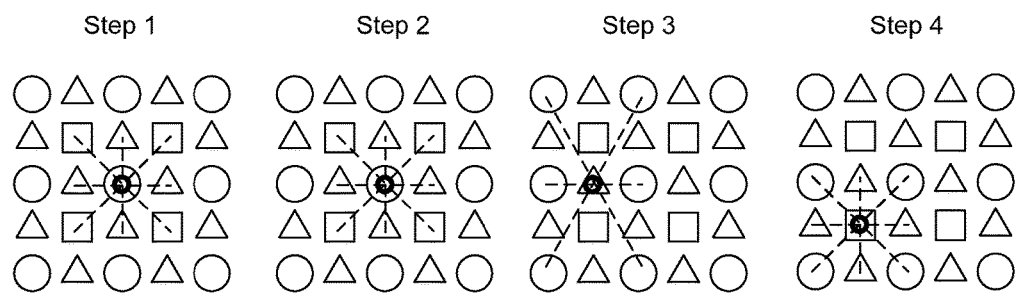
FIG. 31 illustrates an example of pyramid inter-layer phase adaptive offset (IL-PAO) with three levels and four steps for 2× up-sampling.

In yet another embodiment, an inter-layer pyramid PAO is disclosed. Multiple levels of IL-PAO are performed step by step. One level can be repeated multiple times. One example of pyramid IL-PAO with three levels is shown in FIG. 30, where the symbol legends are the same as those of FIG. 29. In the first step, the PO classes are merged into one class for the first round of IL-PAO and one set of IL-PAO parameters is sent in the slice header. In the second step, the pixels at non-zero phase positions, i.e., PO class !=0, are classified for EO and BO to perform the second round of IL-PAO. For EO, only nearest pixels (as indicated by the dashed lines) with PO class=0 are used for EO classification. In the third step, the pixels on non-zero phase positions, i.e., PO class=2, are classified for EO and BO to perform the third round of IL-PAO. For EO, only nearest pixels with PO class !=2 are used for EO classification. In another example with three levels and 4 steps is shown in FIG. 31. In this example, the first level is repeated twice at step 1 and step 2. Steps 3 and 4 are the same steps 2 and 3 of FIG. 30.

In another example, the pixel intensity is used for the classification to extend the inter-layer sample-adaptive offset (IL-SAO) to inter-layer intensity-adaptive offset (IL-IAO). For example, N intensity classes (IC) can be defined as:

If $T(0) <= I(x, y) < T(1)$, Intensity Class $(IC) = 0$;

If $T(1) <= I(x, y) < T(2)$, Intensity Class $(IC) = 1$;

If $T(2) <= I(x, y) < T(3)$, Intensity Class $(IC) = 2$;

...

If $T(N-1) <= I(x, y) <= T(N)$, Intensity Class $(IC) = N - 1$;

where I(x,y) corresponds to the intensity at the pixel location (x, y) and T(i)'s correspond to decision thresholds used for intensity classification. For example, the number of intensity classes, N can be set to 3, T(0)=0, T(1)=25, T(2)=230 and T(N)=T(3)=255. IL-SAO and IL-BO classification are applied to pixels in each IC. EO and BO parameters for each IC can be sent in the slice header. For example, if N is chosen to be 3, EO/BO parameters associated with 3 intensity classes (ICs) need to be sent.

In yet another embodiment, the base layer information is used for the classification to extend IL-SAO. For example, the classification of the up-sampled pixels in a CTB can be based on the collocated CTB split depth information in base layer. The split classes (SC) are defined as: SC=the depth of split. For example, for a pixel of the up-sampled reconstructed base layer picture, the SC is equal to 1 if the depth of split of its collocated CTB in the base layer is 1. After SC classification, IL-SAO and IL-BO are applied to pixels belonging to each SC. IL-EO and IL-BO parameters of each SC are sent in the slice header. For example, if the maximum depth of split is 4, 4 SCs are defined and 4 sets of EO/BO parameters associated with the 4 SCs are sent in the bitstream.

Figure 32:
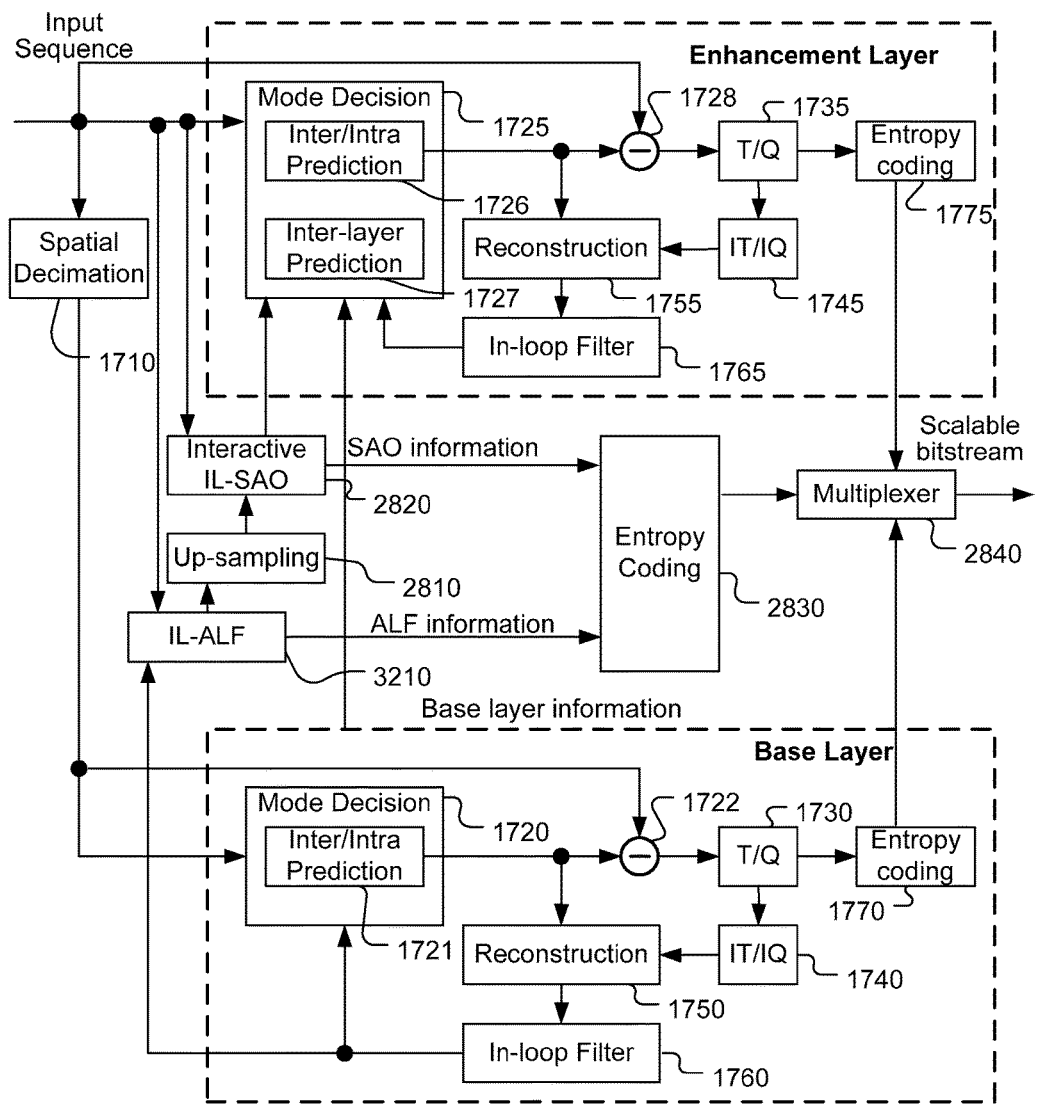
FIG. 32 illustrates a block diagram for an exemplary two-layer scalable video encoding system incorporating inter-layer filtering, where the inter-layer filtering comprises inter-layer ALF, up-sampling and interactive inter-layer SAO.

In another embodiment, the IT-IL-SAO is used along with other types of inter-layer (IL) filtering. For example, IL adaptive loop filter (ALF) 3210, as shown in FIG. 32, is used to filter the reconstructed base layer before the reconstructed base layer is up-sampled to match the spatial resolution of the EL. The filter parameters of the IL-ALF are determined based on the reconstructed base layer signal and the corresponding zero-phase position pixels in the original enhancement layer picture. After the reconstructed base layer signal is processed by IL-ALF, the IL-ALF processed signal is up-sampled to match the spatial resolution of the EL. The iterative IL-SAO (IT-IL-SAO) is then applied to all pixels in the up-sampled picture. The filter parameters of the IL-ALF are provided to entropy coding 2830 so that the decoder can extract the filter parameters and perform the corresponding IL-ALF at the decoder side. In yet another embodiment, the IT-IL-SAO is only applied to the pixels at non-zero-phase position pixels of up-sampled base layer signal that are not filtered by IL-ALF.

Figure 33:
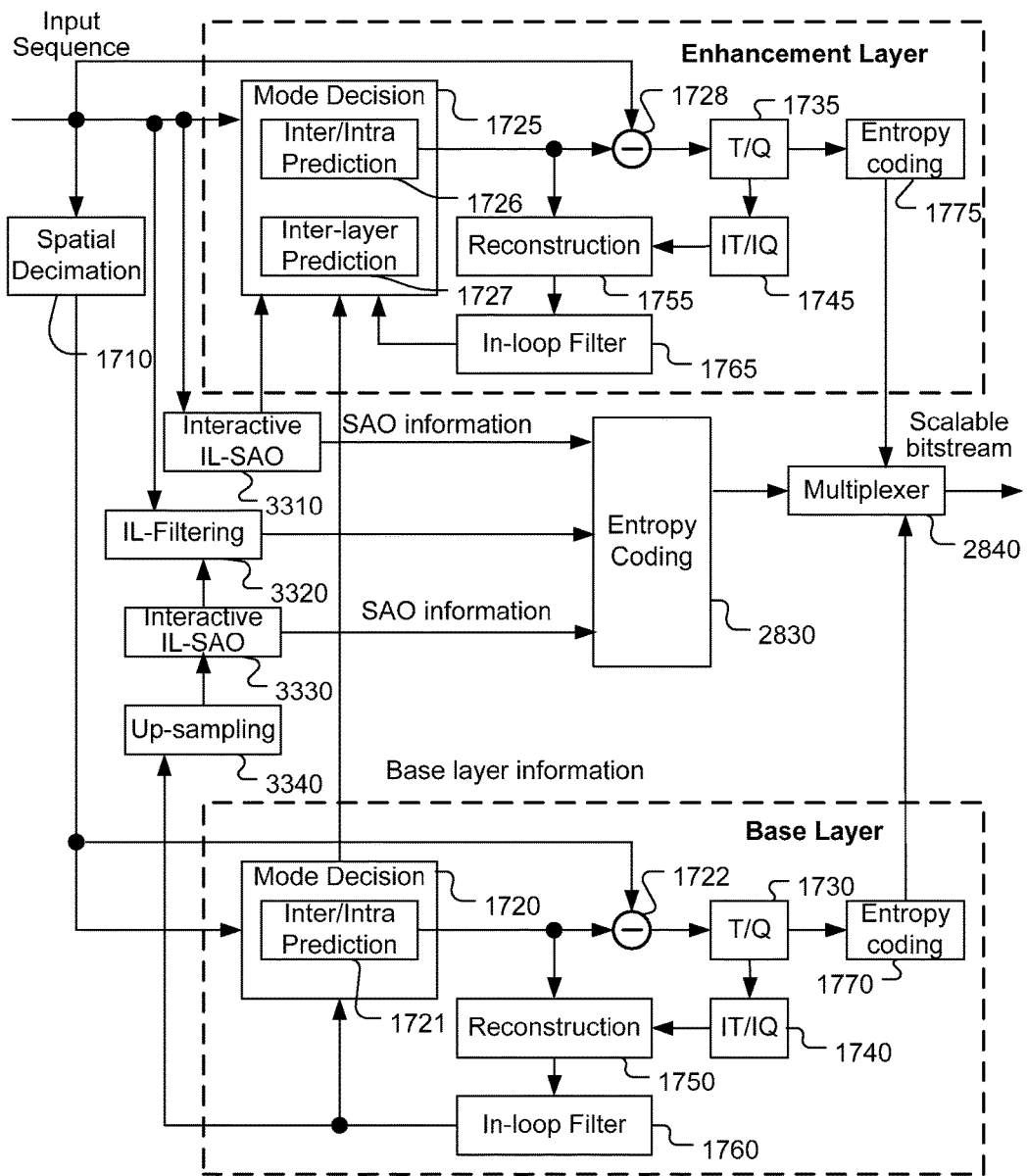
FIG. 33 illustrates a block diagram for an exemplary two-layer scalable video encoding system incorporating inter-layer filtering, where the inter-layer filtering comprises up-sampling, first interactive IL-SAO, IL-filtering and second interactive IL-SAO.

When IL-ALF or other IL filter is used after up-sampling, the IT-IL-SAO can be used before or after the IL-ALF or the other IL filter. IT-IL-SAO 3310 and 3330 are used both before and after the IL-filtering 3320 as shown in FIG. 33, where the reconstructed BL signal is up-sampled using up-sampling 3340.

Figure 34:
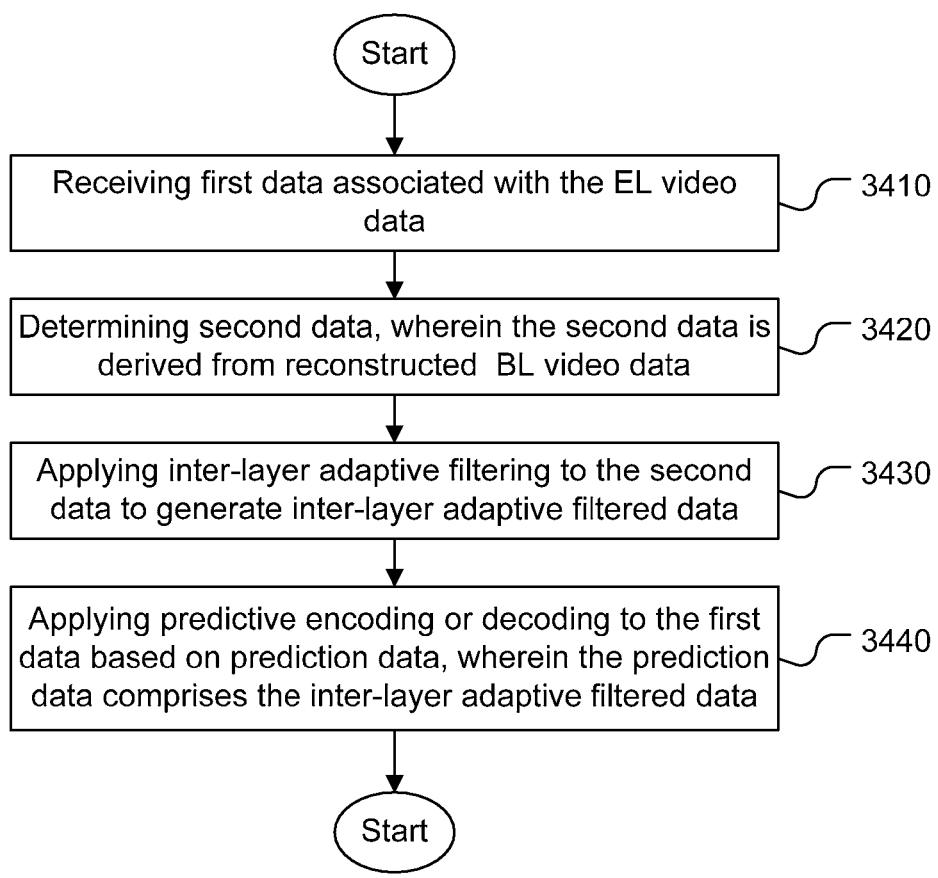
FIG. 34 illustrates an exemplary flowchart for a scalable coding system incorporation inter-layer adaptive filtering according to an embodiment of the present invention.

FIG. 34 illustrates an exemplary flowchart of a scalable video coding system incorporating inter-layer adaptive filtering according to an embodiment of the present invention. The video data is configured into a Base Layer (BL) and an Enhancement Layer (EL), where the EL video data has higher spatial resolution or better video quality than the BL video data. The system receives first data associated with the EL video data as shown in step 3410. For encoding, the first data corresponds to the EL video data to be coded. For decoding, the first data corresponds to prediction residue of the EL video data and, the predictive decoding is applied to the prediction residue to recover the EL video data. The first data may be retrieved from storage such as a computer memory, buffer (RAM or DRAM) or other media. The first data may also be received from a processor such as a controller, a central processing unit, a digital signal processor or electronic circuits that produce the first data. The second data is determined in step 3420, wherein the second data is derived from reconstructed BL video data. The inter-layer adaptive filtering is applied to the second data to generate inter-layer adaptive filtered data as shown in step 3430. Predictive encoding or decoding is then applied to the first data based on prediction data as shown in step 3440, wherein the prediction data comprises the inter-layer adaptive filtered data.

The flowchart shown above is intended to illustrate an example of inter-view prediction based on sub-block partition. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter-layer prediction for scalable video coding, wherein video data is configured into a Base Layer (BL) and an Enhancement Layer (EL) and wherein EL video data has higher spatial resolution or better video quality than BL video data, the method comprising:

receiving data associated with a current EL picture of the EL video data;

generating a first reference picture based on a reconstructed BL picture of the BL video data, the first reference picture including collocated pixels and non-collocated pixels, locations of the collocated pixels having corresponding pixel locations in the current EL picture, and locations of the non-collocated pixels not having corresponding pixel locations in the current EL picture;

generating filtered collocated pixels at locations that correspond to the collocated pixels of the first reference picture by applying inter-layer adaptive filtering to the first reference picture;

generating a second reference picture by performing an adaptive up-sampling only based on the filtered collocated pixels; and encoding the current EL picture or decoding an encoded version of the current EL picture based on the second reference picture.

2. The method of claim 1, wherein the encoding the current EL picture includes applying predictive encoding to the current EL picture.

3. The method of claim 1, wherein the decoding the encoded version of the current EL picture includes applying predictive decoding to prediction residue of the current EL picture.

4. The method of claim 1, wherein a spatial resolution of the second reference picture matches a spatial resolution of the current EL picture.

5. The method of claim 1, wherein the inter-layer adaptive filtering corresponds to inter-layer sample adaptive offset (IL-SAO), inter-layer adaptive loop filtering (IL-ALF), or a combination of IL-SAO and IL-ALF.

6. The method of claim 5, wherein first filter information associated with the inter-layer adaptive filtering shares second filter information associated with base layer SAO, base layer ALF or a combination of the base layer SAO and the base layer ALF.

7. The method of claim 5, wherein first filter information associated with the inter-layer adaptive filtering is shared by second filter information associated with enhancement layer SAO, enhancement layer ALF or a combination of the enhancement layer SAO and the enhancement layer ALF.

8. The method of claim 1, wherein filter coefficients for the inter-layer adaptive filtering are determined to reduce a difference between the current EL picture and an up-sampled version of the reconstructed BL picture according to a difference measure.

9. The method of claim 8, wherein the filter coefficients for the inter-layer adaptive filtering are determined using mean square error (MSE) design procedure or Wiener filter design procedure.

10. The method of claim 1, wherein
when the inter-layer adaptive filtering corresponds to a single filter or concatenated multiple filters,
the single filter or the concatenated multiple filters are determined based on the current EL picture and either the first reference picture or an up-sampled version of the reconstructed BL picture.

11. The method of claim 1, wherein the adaptive up-sampling is associated with a fixed interpolation filter.

12. The method of claim 1, wherein filter information associated with the inter-layer adaptive filtering is used by a picture and a flag is used by each region, slice, largest coding unit, coding unit, or block of the picture to indicate whether the inter-layer adaptive filtering is applied to the region, slice, largest coding unit, coding unit, or block of the picture.

13. The method of claim 1, wherein the generating the first reference picture includes using the reconstructed BL picture as the first reference picture, or using output data resulted from applying in-loop filtering, a combination of the in-loop filtering and sample adaptive offset (SAO), or a combination of the in-loop filtering, the SAO and adaptive loop filtering (ALF) to the reconstructed BL picture as the first reference picture.

14. The method of claim 1, wherein filter information associated with the inter-layer adaptive filtering is included in a bitstream on a block basis or quadtree basis.

15. The method of claim 1, wherein filter information associated with the inter-layer adaptive filtering is included in a slice level or a largest coding unit (LCU) level.

16. The method of claim 1, wherein the generating the second reference picture includes generating interpolated pixels for generating the second reference picture by interpolating the collocated pixels.

17. The method of claim 16, wherein the interpolated pixels are generated based on a location-based classification.

18. The method of claim 16, wherein the generating the second reference picture includes using an up-sampled picture including the interpolated pixels and up-sampled collocated pixels as the second reference picture, or using output data resulted from applying another inter-layer adaptive filtering to the up-sampled picture as the second reference picture.

19. The method of claim 1, wherein the inter-layer adaptive filtering is applied at a picture level or a region, wherein the region corresponds to a first group of coding units, a second group of largest coding units (LCUs), a slice, a third group of slices, a tile or a fourth group of tiles.

20. The method of claim 1, wherein filter coefficients of the inter-layer adaptive filtering are included in picture parameter set (PPS), adaptive parameter set (APS), or a slice header.

21. The method of claim 1, wherein a flag is included in each largest coding unit (LCU) to indicate whether the inter-layer adaptive filtering is applied to the LCU, wherein fixed filtering is used if the flag indicates that the inter-layer adaptive filtering is not applied to the LCU.

22. The method of claim 1, wherein a first flag is included in sequence parameter set (SPS) of a sequence to indicate whether the inter-layer adaptive filtering is allowed for pictures in the sequence.

23. The method of claim 22, wherein, when the first flag indicates that the inter-layer adaptive filtering is allowed for the pictures in the sequence, a second flag is included in picture parameter set (PPS) of a corresponding picture to indicate if the inter-layer adaptive filtering is allowed for the corresponding picture.

24. The method of claim 1, wherein the first reference picture corresponds to the reconstructed BL picture, and wherein the inter-layer adaptive filtering comprises a fixed set of filters followed by adaptive filtering.

25. The method of claim 24, wherein
the generating the first filtered reference picture includes applying a single filter to the reconstructed BL picture,
the single filter is equivalent to combined filtering using the fixed set of filters and the adaptive filtering, and
filter coefficients of the adaptive filtering are derived from a bitstream.

26. The method of claim 1, wherein the inter-layer adaptive filtering comprises iterative inter-layer sample adaptive offset (IT-IL-SAO).

27. The method of claim 1, wherein the inter-layer adaptive filtering comprises adaptive filtering followed by fixed up-sampling.

28. The method of claim 1, wherein the inter-layer adaptive filtering comprises multiple inter-layer filtering branches and one of the multiple inter-layer filtering branches is selected for the inter-layer adaptive filtering.

29. An apparatus for inter-layer prediction for scalable video coding, wherein video data is configured into a Base Layer (BL) and an Enhancement Layer (EL) and wherein EL video data has higher spatial resolution or better video quality than BL video data, the apparatus comprising:
  circuitry, wherein the circuitry is configured to
    receive data associated with a current EL picture of the EL video data;
    generate a first reference picture based on a reconstructed BL picture of the BL video data, the first reference picture including collocated pixels and non-collocated pixels, locations of the collocated pixels having corresponding pixel locations in the current EL picture, and locations of the non-collocated pixels not having corresponding pixel locations in the current EL picture;
    generate filtered collocated pixels at locations that correspond to the collocated pixels of the first reference picture by applying inter-layer adaptive filtering to the first reference picture
    generate a second reference picture by performing an adaptive up-sampling only based on the filtered collocated pixels; and
    encode the current EL picture or decode an encoded version of the current EL picture based on the second reference picture.

30. The apparatus of claim 29, wherein a spatial resolution of the second reference picture matches a spatial resolution of the current EL picture.

* * * * *